(12) United States Patent
Hinderling

(10) Patent No.: US 11,486,704 B2
(45) Date of Patent: Nov. 1, 2022

(54) INTELLIGENT POSITIONING MODULE

(71) Applicant: HEXAGON TECHNOLOGY CENTER GMBH, Heerbrugg (CH)

(72) Inventor: Jürg Hinderling, Marbach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 463 days.

(21) Appl. No.: 16/698,726

(22) Filed: Nov. 27, 2019

(65) Prior Publication Data
US 2020/0166340 A1 May 28, 2020

(30) Foreign Application Priority Data

Nov. 28, 2018 (EP) .................................. 18208934

(51) Int. Cl.
*G01C 15/00* (2006.01)
*G01C 15/06* (2006.01)
*G01S 17/42* (2006.01)

(52) U.S. Cl.
CPC ......... *G01C 15/006* (2013.01); *G01C 15/008* (2013.01); *G01C 15/06* (2013.01); *G01S 17/42* (2013.01)

(58) Field of Classification Search
CPC .................................................. G01C 15/006
See application file for complete search history.

(56) References Cited

U.S. PATENT DOCUMENTS

| | | |
|---|---|---|
| 5,159,760 A | 11/1992 | Spiegel |
| 6,169,517 B1 | 1/2001 | Eslambolchi |
| 6,411,372 B1 | 6/2002 | Donath |
| 7,200,945 B2 * | 4/2007 | Endo ............... G01C 15/002 33/290 |
| 7,583,373 B2 | 9/2009 | Schwarz |
| 7,911,589 B2 | 3/2011 | Siercks |
| 8,345,928 B2 * | 1/2013 | Svanholm ........... G01C 15/00 382/106 |
| 9,322,654 B2 * | 4/2016 | Böckem ............. G01S 17/06 |
| 9,377,303 B2 * | 6/2016 | Giger ................. G01C 5/00 |
| 9,658,335 B2 | 5/2017 | Siercks et al. |
| 10,120,077 B2 | 11/2018 | Stutz |

(Continued)

FOREIGN PATENT DOCUMENTS

| | | |
|---|---|---|
| AT | 11099 U1 | 4/2010 |
| CN | 1727845 A | 2/2006 |

(Continued)

OTHER PUBLICATIONS

Extended European Search Report dated Sep. 12, 2019 as received in Application No. 18208934.2.

(Continued)

*Primary Examiner* — Michael A Berns

(74) *Attorney, Agent, or Firm* — Maschoff Brennan

(57) ABSTRACT

A stand-alone module for localizing a surveying device installed with a stand above a ground mark. The module has at least one housing attached between the stand and the surveying device, a measuring camera unit, which is arranged and designed in such a way that when the module is mounted on a stand the ground mark can be detected in the field of view of the measuring camera unit, a power supply, an inclination sensor and a communication unit.

15 Claims, 6 Drawing Sheets

(56) References Cited

U.S. PATENT DOCUMENTS

| | | | |
|---|---|---|---|
| 10,451,736 B2 | 10/2019 | Stutz | |
| 10,754,010 B2* | 8/2020 | Hinderling | G01S 7/487 |
| 10,890,446 B2* | 1/2021 | Bernhard | G01B 11/002 |
| 11,015,932 B2* | 5/2021 | Gächter Toya | G01C 15/002 |
| 11,041,943 B2* | 6/2021 | Meuret | G01S 7/481 |
| 2006/0021236 A1 | 2/2006 | Endo | |
| 2007/0052951 A1 | 3/2007 | Leica | |
| 2010/0157848 A1 | 6/2010 | Das | |
| 2010/0303300 A1 | 12/2010 | Svanholm | |
| 2014/0163775 A1 | 6/2014 | Metzler | |
| 2014/0190025 A1 | 7/2014 | Giger et al. | |
| 2014/0232859 A1 | 8/2014 | Kotzur | |
| 2014/0373369 A1 | 12/2014 | Böckem | |
| 2015/0042977 A1 | 2/2015 | Siercks | |
| 2018/0003493 A1 | 1/2018 | Bernhard et al. | |
| 2018/0156895 A1 | 6/2018 | Hinderling et al. | |
| 2018/0238687 A1 | 8/2018 | Gächter Toya et al. | |
| 2020/0166340 A1* | 5/2020 | Hinderling | F16M 11/046 |

FOREIGN PATENT DOCUMENTS

| | | |
|---|---|---|
| CN | 201016733 Y | 2/2008 |
| CN | 202119425 U | 1/2012 |
| CN | 202350775 U | 7/2012 |
| CN | 103185586 A | 7/2013 |
| CN | 103477189 A | 12/2013 |
| CN | 103733024 A | 4/2014 |
| CN | 103827631 A | 5/2014 |
| CN | 104081157 A | 10/2014 |
| CN | 104142505 A | 11/2014 |
| CN | 204286436 U | 4/2015 |
| CN | 104864852 A | 8/2015 |
| CN | 207179112 U | 4/2018 |
| CN | 207351434 U | 5/2018 |
| CN | 207486392 U | 6/2018 |
| CN | 108469618 A | 8/2018 |
| CN | 208026870 U | 10/2018 |
| DE | 40 07 245 A1 | 9/1991 |
| DE | 4007245 A1 | 9/1991 |
| DE | 19941638 C1 | 12/2000 |
| EP | 0 971 207 A1 | 1/2000 |
| EP | 0971207 A | 1/2000 |
| EP | 1 207 369 A1 | 5/2002 |
| EP | 1 686 350 A1 | 8/2006 |
| EP | 1 882 959 A1 | 1/2008 |
| EP | 2 442 069 A1 | 4/2012 |
| EP | 2 620 745 A1 | 7/2013 |
| EP | 2 680 028 A1 | 1/2014 |
| EP | 3 070 494 A1 | 9/2016 |
| EP | 3 171 130 A1 | 5/2017 |
| EP | 3171130 A1 | 5/2017 |
| EP | 3 264 034 A1 | 1/2018 |
| EP | 3 324 203 A1 | 5/2018 |
| JP | 05281904 A | 10/1993 |
| WO | 2017015507 A1 | 1/2017 |

OTHER PUBLICATIONS

Nindle, Daniel, "Surveying Tribrachs—White Paper", Leica Geosystems. Mar. 2010.

Chinese Search Report dated May 6, 2022 as received in application No. 201911189952.1.

* cited by examiner

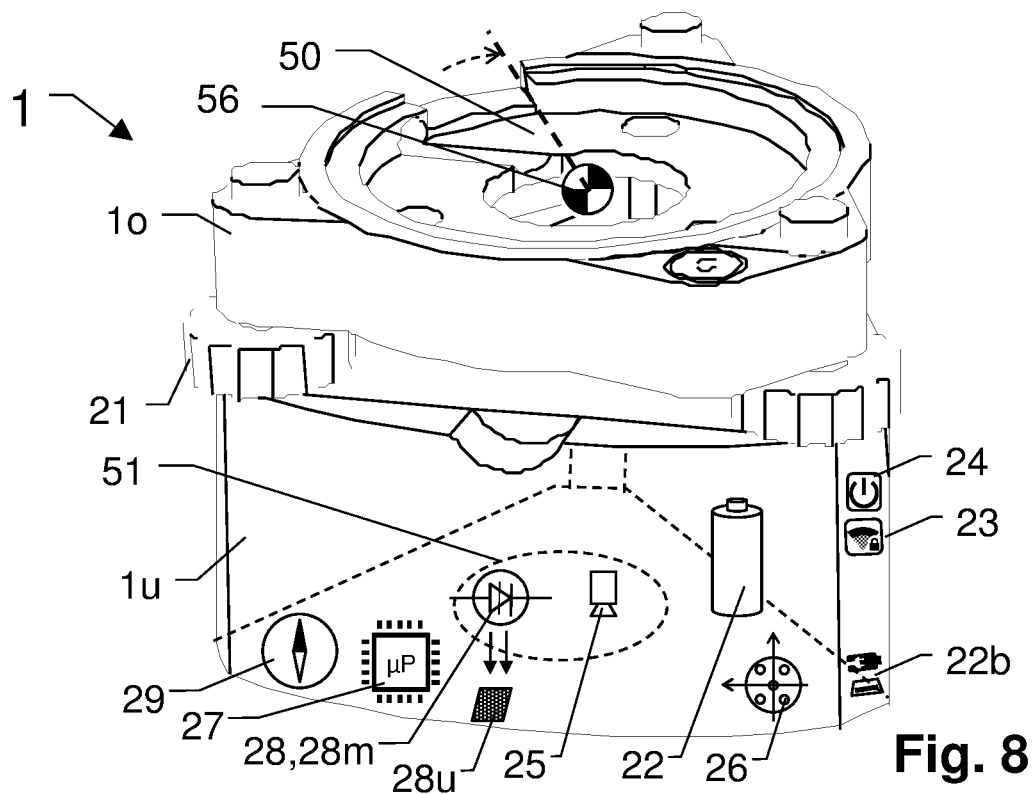
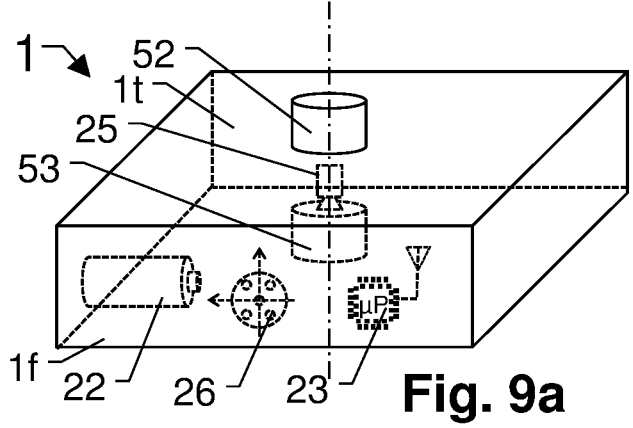
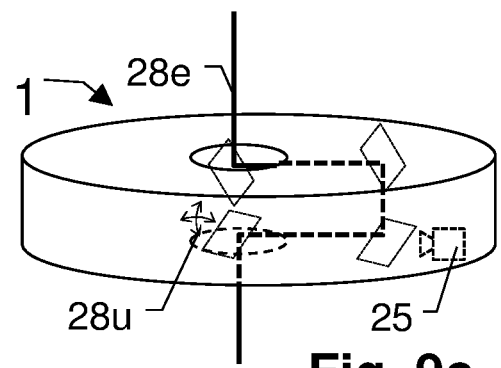
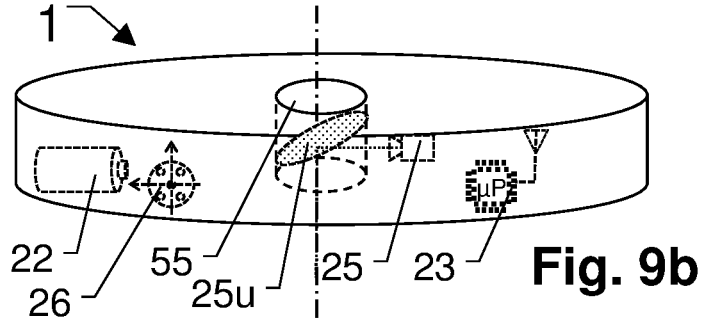

60
Attaching the module according to the invention between a stand and a surveying device

61
Coarse positioning of the stand in a region above a ground point as a reference point

62
Recording inclination information of the module and an image of the ground under the stand by the module

63
Detecting or selecting the ground point in the image as a reference for a localization of the surveying device in an external coordinate system

64
Measuring the ground point in the image by the module and calculating the localization, optionally incorporating other sensors in the module and/or the surveying device

65
Providing the localization or the necessary raw data from the module to the surveying device via a communication link

Fig. 10

INTELLIGENT POSITIONING MODULE

CROSS-REFERENCE TO RELATED APPLICATIONS

This application claims priority to European Patent Application No. 18208934.2, filed on Nov. 28, 2018. The foregoing patent application is herein incorporated by reference.

FIELD OF THE INVENTION

The invention relates to a module for localization of a surveying device in relation to a ground mark according to the preamble of claim 1, and to a method and device for such a localization.

The invention relates specifically to an electronic positioning or localizing module, in particular an intelligent or smart tribrach module, which can be used as a mounting platform for surveying equipment. Specifically, it consists of a stand-alone module which can be attached between a mounting device, such as a tripod or similar, and a surveying device in order to achieve a referenced and optionally level-adjustable positioning of the surveying device above a point on the ground. In particular, this ground point can be surveyed in an external coordinate system and thus have a known location in the external coordinate system, so that this ground point is suitable for localizing the surveying device in relation to the external coordinate system, such as a ground mark, a benchmark or measuring point, a fixed point or geodetic reference point, or else a temporary, local reference mark on a building site, etc.

BACKGROUND

Standard tribrach modules are essentially designed with a lower mounting plate for connection to the mounting device and with an upper mounting plate for connection to the surveying device, and with two or usually three length-adjustable adjusting screws arranged in a triangle, which connect these mounting plates. In most cases, the upper mounting plate is implemented with at least one spirit level or a circular spirit level, by means of which the upper mounting plate can be aligned horizontally by manual adjustment of the adjusting screws. The upper mounting plate is often implemented with a quick-change or quick-clamping device for a surveying device, or connected to such a device. Examples of generic tribrachs and their application are described in the relevant literature on surveying, for example, in the 2010 document published by Leica Geosystems AG "Surveying Tribrachs—White Paper" (VII.10-INT) among others.

A disadvantage of these, however, is that a proper adjustment of such a tribrach requires a certain degree of skill and instinctive touch, and is found to be quite a challenging task, especially for inexperienced users. The classical approach usually involves a rough leveling of the tribrach with a circular spirit level vial followed by a finer leveling with the tubular spirit level, e.g. with an alidade or striding level, or using an electronic inclinometer on the surveying device.

A further aggravating factor for many surveying tasks is that not only is it important to achieve the most exact leveling or horizontal alignment, but the surveying device is often also required to be installed in a centered position, thus with a known reference to a defined ground point as a fixed point. Such a centering can be carried out when setting up the stand by fixing the surveying device exactly above a fixed point, such as a survey point, a ground mark, benchmark or similar. Centering means that the projection of the center of the horizontally aligned tribrach meets the ground mark in the gravity direction. A surveying stand or tripod usually has an opening (e.g. circular with a diameter of 6 to 8 cm) on the stand head or in the stand head plate, through which the surveying device is clamped in place from below, either directly or usually by means of a tribrach to hold the surveying device, using a so-called heart screw or centering screw on a typically flat surface of the stand head, implemented as a so-called stand plate. By slight displacement of the surveying device in the horizontal direction, by means of an optical plumb or plumb line the surveying device can be centered above a ground point, benchmark or survey point before the heart screw is fully tightened. This is usually carried out in an iterative process of horizontal alignment and centering by adjustments to the stand and/or tribrach. The heart screw is often designed to be hollow, so that an optical plumb or laser plummet can be aimed through it on to the ground. The centering of the device position can also be carried out with the help of other plumb devices. however, e.g. with a plumb-line or plumb-rod.

If the extension of the vertically true normal axis of the surveying device passes through the desired ground mark of the fixed point, the surveying instrument is centered and can perform measurements in the reference system of the external coordinate system. The surveying device axis system should thus be stationed vertically true above the ground point, or the extent of any deviations in the horizontal direction should be known as accurately as possible. The vertical height of the surveying device axis system or of the base of the surveying device above the ground point must also usually be identified during the positioning, e.g. with a tape measure or the like, and entered in the surveying device to complete the localization.

In terms of the achievable measurement accuracy with modern surveying devices, such a positioning or the localization should be carried out with an accuracy in the millimeter range, or in the seconds of arc range, or preferably even more precisely. In addition, in many cases an azimuthal reference should also be determined, i.e. a horizontal orientation with respect to the direction of North.

All of these are causes for the fact that a positioning and localization of surveying devices is usually only feasible in a reasonable time and with sufficient accuracy for trained and qualified personnel. Ordinary workers in particular, site supervisors, foremen, etc.—who are usually only occasionally expected to perform such tasks—therefore often avoid this work and/or are insecure and/or slow in their execution.

Although there are specially developed extended versions of surveying devices which provide support for positioning, such as those described in US 2018/0003 493 EP 2 442 069, US 2010/0303 300, etc., such devices are more complex and expensive, and not easily replaceable. Their application also often varies from device to device and/or requires special knowledge. For example, EP 3 264 034 also discloses a geodetic surveying device with a height measurement system, or EP 1 207 369 discloses a sensor holder for carrying out centered installations.

To summarize, in particular less-experienced users of surveying devices find the work steps of positioning and centering the surveying device above a fixed point, and determining the instrument height for the localization of a surveying device in an external coordinate system, to be a complicated task. Many users are also concerned about potential measurement errors due to incorrect or inaccurate positioning or undetected movements of the surveying device over the period of the measurement, for example, if the stand sinks and/or the installation was not performed optimally.

BRIEF DESCRIPTION OF THE INVENTION

Some aspects of the present invention can contribute to reducing these problems. In particular, some aspects of the invention can be used to avoid errors in these manual activities and/or to improve the accuracy of the positioning—and thus also the measurements based on it. In particular, for non-surveying specialists, such as foremen or other craftsmen, it is intended to remove the "fear" of installing a sophisticated surveying device, such as a total station or a TPS.

A further aspect which can be improved with some aspects of the present invention is a positioning of the surveying device by determining the coordinates of the position and orienting the instrument. Particularly in the case of free positioning, or an installation without a ground point, for repeated installations in the same place an additional free positioning which is complicated to implement can be avoided by, after an initial free stationing operation, placing a ground mark under the positioned device, such as a concrete anchor, a colored marker, a secured target plate, a label, a notch, etc. This placed ground mark can then be used during subsequent positioning operations according to some aspects of the present invention, and thus simplify the subsequent positioning and also make it safer. As with other embodiments according to the invention, an image determined using the camera in the module according to the invention during the initial positioning can optionally be stored, and in a repeated positioning the new position can be (at least partially) determined using a photogrammetric comparison between the current and the saved image, particularly in applications with a target plate, appropriately designed with visual features, which is permanently placed as a ground mark (at least during a period between the positioning operations).

Some aspects of the invention are also designed to address issues such as compatibility, usability, and retrofitting ability with a plurality of (also older) surveying devices, a compact and rugged design, autonomous energy supply, low energy consumption, etc. Preferably, an embodiment of the invention should be implemented as a stand-alone module or accessory, which is designed to be used with standard surveying stands and/or surveying devices as required.

A part of the object of some aspects of the present invention are therefore also to make it usable in a modular and versatile way, in particular, to be agile, able to be retrofitted with different surveying devices, etc. Also, compatibility and functionality in regard to a preferably automatic digital documentation, e.g. in a BIM (Building Information Modeling) system, or simple operation and ability to be integrated into the standard operating concepts can be achieved within the context of the present invention.

For example, some aspects of the present invention can therefore help to simplify and accelerate the positioning of a surveying device and/or to avoid or reduce errors in the positioning and/or in the operation of the surveying device, specifically, for example, in comparison to standard positioning techniques with iterative adjustment of mechanical tribrach modules and stands using circular spirit levels, tape measures, plumb lines, etc.

One object of some aspects of the invention can also be considered to be to facilitate the previously manually performed positioning of a surveying device using an automated process as far as possible, in particular by performing all measuring tasks for determining the location automatically with a module according to some aspects of the invention. The manual steps during the installation can be limited, for example, to: unfolding the stand approximately above the ground mark, (if not already taken place—attaching the module according to the invention) and attaching the surveying device, and if necessary, a manual leveling and/or placing a target plate over the ground mark. Specifically, according to some aspects of the invention, it is possible firstly to carry out a highly automated installation of the surveying device and secondly, a preferably complete automation in the determination of the transformation (e.g. a Helmert transformation) between the local and global coordinate systems.

In particular due to demands for increased measurement speed, the motors and rapid movements of the surveying device also cause higher accelerations, torques, shock, vibration, etc. to occur with respect to the installation device of the surveying device. These can lead—in addition to the already problematic influences such as twisting of the stand, sinking of the stand legs, temperature effects, etc.—to additional unwanted displacements of the positioning during the measuring operation.

These objects are achieved, or the solutions refined, according to some aspects of the invention by the features of the independent claims and/or by features of the dependent claims.

Some aspects of the present invention relate to a stand-alone module for localizing a surveying device, which is installed with a stand above a ground mark, in relation to the ground mark. The stand-alone module can be designed, in particular, as a mountable and demountable device, which apart from any data communication connection to an external operating unit and/or to a surveying device, forms an autonomously acting, separate unit or component.

The module has a housing which is designed to be attached between the stand and the surveying device. The housing is in particular designed with a lower mounting plate or mounting unit for connection to the stand and with an upper mounting plate or mounting unit for connection to the surveying device, these connections preferably being implemented with commercially available or standardized stand screws and/or quick-release clamping devices. In a first embodiment of the invention the two mounting plates of the module according to the invention can be designed fixed relative to each other, in particular such that they cannot be tilted relative to each other. In a second embodiment of the invention the two mounting plates of the module according to the invention, which forms a compact, preferably integral unit, can be designed to be adjustable relative to each other, in particular in their inclination or tilt relative to each other.

The module also has at least one measuring camera unit, which is arranged and designed in such a way that—when the module is mounted on a stand—a ground mark located under the stand can be detected in the field of view of the measuring camera unit. In particular, such a measuring camera unit can be implemented as a central measuring camera whose field of view is directed centrally through the stand, thus through a recess in the stand plate or through a hole drilled in the heart screw of the stand, or in other words essentially or approximately coincident with a vertical axis or central axis of the surveying device, onto at least a portion of the ground under the stand. In particular, such a measuring camera unit can also alternatively or additionally be designed as a peripheral measurement camera, whose field of view is directed next to a shoulder or stand plate of the stand, i.e. through the stand legs, onto at least a portion of the ground under the stand.

In other words, the field of view of a measuring camera unit of a module according to some aspects of the invention can be arranged centrally right through the stand, in particular through a hole drilled in a heart-screw with which the module is fixed to the stand. Specifically, this means that the optional laser pointer can also be reflected into the field of view of the measuring camera unit. Alternatively, the measuring camera unit and/or its field of view can be designed to be pivotable or displaceable in such a way that the field of view passes through the stand or this central region is left clear for a laser pointer, so that alternately either the laser pointer or the measuring camera can be used. The field of view of the measuring camera unit of a module according to the invention can alternatively also be oriented to run past the side of a stand shoulder or a stand plate of the stand and in the direction of the ground point, thus e.g. onto an area between the stand legs.

The module also has an energy supply. For example, in the form of a battery compartment or an internal, preferably rechargeable battery.

The module also has an inclination sensor which is designed to determine an inclination of the module with respect to a horizontal direction and/or a vertical direction in at least two axes. The inclination sensor is advantageously located in the lower mounting plate, the inclination of the upper mounting plate can be determined using the inclination sensor in the surveying instrument.

The module is equipped with a communication unit, which is designed to establish a communication link between the surveying device and/or an external operating unit, preferably a bi-directional wireless communication via a radio module, in particular according to a current wireless standard.

A localization unit in the module is designed in such a way that at least using image information from the measuring camera unit, in the field of view of which the ground mark is included, and inclination information from the inclination sensor, this determines the location of the module in relation to the ground mark, and provides this location and/or the raw data required for the localization, via the communication unit. In particular, this location can comprise at least a normal height and lateral position offset of the module with respect to the ground mark. The position of the module relative to the external coordinate system is defined exactly by means of a pivot point. In the first embodiment mentioned above such a pivot point can be located, for example, in the axial center on the upper mounting plate. The localization can be determined specifically using electronic image processing of the image information, which determines a location of the ground mark in the image information in the form of image coordinates, and the inclination information, from the geometric relationships of which (which are known from the design and arrangement of the measuring camera and inclination sensor) the location is calculated. If the localization can be carried out on the basis of the image information with a measurement of the ground mark itself, and/or a measurement of a visual pattern of a defined target plate which is placed near the ground mark, preferably at a defined location, which measurement is carried out in the image information and can take into account imaging properties of the measuring camera unit.

The measurement of the target plate in the image information can specifically determine a scaling in the camera image. On the basis of this measurement in the image information and the scaling it is possible to determine at least both a lateral horizontal position of the module (or a pivot point defined in relation to the module) with respect to the ground mark, as well as a normal height of the module (or of a pivot point defined in relation to the module) above the ground mark. The measurement of the target plate in the image information can also evaluate a measuring instrument present on the target plate, such as a compass (e.g. a magnetic needle compass) in the image information, and using this evaluation determine an orientation relative to North. Another example of an additional or alternative measuring instrument on the target plate is, e.g., an inclinometer (such as a circular spirit level or tubular spirit level), on the basis of the evaluation of which in the image information, for example, a fine correction of the plate inclination can be made, in case the target plate is not resting horizontally on the ground mark.

In one embodiment of the module according to the invention an automatic localization of a surveying device can only be carried out with the module and a target plate placed on the ground mark. One embodiment, which does not rely on a target plate, has a distance measuring laser pointer which is aligned to the ground mark and on the basis of which a normal height relative to the ground mark is determined for the localization.

For a complete localization in all six degrees of freedom, the knowledge of the azimuth direction on the module according to the invention is additionally required. In particular if the embodiment of the module according to the invention does not itself have a north sensor designed for this purpose, the azimuth direction can also be provided by the surveying device, for example, taking account of an optical or mechanical specification, a defined orientation of the surveying device relative to a marking on the upper mounting plate of the module. Because the north alignment used in this case is only used in the module according to the invention for localization in 6 degrees of freedom (6 DOF), the requirement on the angular accuracy of the north alignment can be kept comparatively low (e.g. compared to the angular accuracy which is/must be achievable with the surveying device), for example, such that it is also achievable with a mechanical or electronic magnetic compass. For example, in the context of the localization according to the invention an angular accuracy of the north alignment of around 10 minutes of arc is quite sufficient.

With the localization provided by the module the surveying device can therefore establish a reference to an external coordinate system in which the ground point is known, and perform its measurements with reference to this external coordinate system. If in addition an arc-second precision of the absolute orientation of the horizontal angle circle (=north direction) of the surveying device is required, this can be determined using conventional techniques on the surveying device itself.

In one embodiment the module according to the invention can be designed with an optional laser pointer or laser plumb line and with a deflection unit for the laser pointer, which is designed in such a way that the laser radiation of the laser pointer can be aligned to the ground point in relation to the module. In this case the laser beam of the laser pointer is used as a marking or pointing beam. In particular, a value of the current deflection of the deflection unit can be detected as deflection information, for example with a position encoder, inclination sensor on the deflection element and/or the point of incidence of the laser pointer in the picture information can be evaluated. In other words, a deflection direction of the deflection unit for the laser pointer can thus be detected by a sensor, in particular an angle encoder, position encoder or a second inclination sensor on a deflection element. Alternatively or additionally the deflection direction of the laser pointer can also be determined using an image analysis of a point of incidence of the laser beam of the laser pointer or laser plummet in an image of the measuring camera unit. The deflection information can be determined from the image of the measuring camera unit, in which case an encoder in the deflector which might also be used for this purpose can be dispensed with. Since the image and field of view of the measuring camera unit is direction-calibrated, a direction of the laser pointer can be determined in the image, for example by determining and measuring a point of incidence of the laser pointer radiation in the image, and a scaling or length of the central projection from a distance measurement also being included. This distance measurement can be determined using a known size of a visual contrast pattern on a target plate located on the ground mark in the image of the measuring camera, for example, by means of central projection. As an alternative however, a distance determined by a distance-measuring laser pointer can also be used. If a target plate according to the invention is used, this means that the direction of the laser radiation of the laser pointer can be determined from the image of the measuring camera alone.

In one embodiment, the deflection unit can be motor-driven and the laser pointer can preferably be automatically aligned to the ground mark according to an image recognition of the ground mark in the image of the measuring camera is. In an alternative embodiment the deflection unit can also be moved manually by the user, for example using levers or adjustment wheels.

In one embodiment of this laser pointer it can be designed as a distance-measuring laser pointer, with the laser radiation of which an electro-optical distance measurement to a point of incidence of the laser radiation can be carried out, for example, in the form of an electro-optical laser distance meter.

The localization unit in this case can be designed in such a way that with the additional inclusion of the distance information from the electro-optical distance measurement and/or with the deflection information from the deflection unit, it performs or calculates the localization.

In a further embodiment of this optionally distance-measuring laser pointer, this can be controllable as a laser plummet, wherein a vertical direction of the inclination sensor installed in the lower mounting plate can be used for the alignment of the beam direction.

The module according to some aspects of the invention can be specifically designed as a tribrach, in particular with one, two or three manually adjustable adjustment screws for leveling or horizontally aligning a mounted surveying device by adjusting the upper mounting plate of the module relative to the lower mounting plate of the module. In doing so, the tribrach device can be specifically designed such that a height of a pivot point of the module relative to the lower mounting plate remains unchanged when adjusting the screws. For example, mounting can be provided by a spherical cap.

In one specific embodiment the localization unit can be designed in such a way that based on a coarse position of a current location of the module, either provided or determined by the module itself, the localization unit queries a local or cloud database of ground markings at or around the current location. Using the database an external coordinate system is then automatically assigned to the ground mark at the current location. The coarse position can be determined, for example, by means of a GNSS or GPS receiver in the module, in the surveying device or in an external operating unit.

In one embodiment the localization unit of the module can be designed such that a preferably automatic, precise fine targeting of the laser pointer on the ground point, based on an image recognition algorithm and/or artificial intelligence, is performed, in particular with an automatic detection of a point of incidence of the laser radiation of the laser pointer in the image of the measuring camera unit. In this case the laser pointer can be designed as a distance-measuring laser pointer which determines an inclined distance between the module and the ground mark, from which inclined distance together with measurements of the inclination sensor, a location of the ground mark in the camera image and/or a deflection direction of the deflection unit from the localization unit, a vertical normal height of the module above the ground mark is determined.

One embodiment of the module according to the invention may optionally also have an electronic compass, in particular for magnetic or gyroscopic azimuthal direction determination relative to north. The localization unit can be designed in such a way that it also includes azimuthal information from the electronic compass in the localization.

The surveying device can be specifically a theodolite, a tachymeter, a total station, a laser scanner, a laser tracker, a GNSS receiver, a leveling device or a rotating laser. The stand can be an installation device, which is designed, for example, as a tripod, a surveying stand, a clamp stand, a surveying pillar or a fixed-mounted surveying console.

In other words, an embodiment according to the invention can be designed as an intelligent tribrach module for a surveying device, which is designed to be mounted as an intermediate layer between an installation device and the surveying device, with a lower mounting plate for at least temporarily attaching the tribrach module to the installation device and an upper mounting plate for at least temporarily attaching the surveying device or a rapid assembly device for this. In a housing of the module at least one measuring camera unit oriented towards the ground is located, and an inclinometer, together with a power supply and a localization unit, which is designed to calculate, based on an image recognition of an image of the measuring camera and measurements from the inclination sensor, a localization relative to a ground mark picture captured by the measuring camera, and to provide this localization to the surveying device via a communication interface of the module.

Some aspects of the present invention in this case also relate to a corresponding target plate, designed to be placed essentially horizontally on a ground mark, which is designed, in particular, for use with a module according to the invention. This can be designed, for example, as a flat plate which can be fixed or placed on the ground. Such a target plate has at least a visually perceptible contrast pattern of known absolute dimensions, in particular wherein these dimensions can be indicated or coded on the target plate. The target plate has a device for positioning the target plate above a ground mark, in particular designed as an essentially centric hole or transparent window, which is designed to be positioned above the ground mark, optionally with a crosshair or the like in the hole or window.

An embodiment of such a target plate can additionally comprise a magnetic needle compass in the plane of the target plate, which is designed for determining the north-referenced azimuthal alignment of the target plate. According to the invention the target plate itself must not necessarily be aligned to north above the ground mark, but alternatively, according to the invention a measurement of the magnetic needle compass can be read off or evaluated in the image information of the measuring camera, while the target plate is located in any azimuthal direction. The visual construction of the magnetic needle compass can be specifically designed for readability with a camera.

One embodiment of such a target plate can additionally have a circular spirit level or two orthogonal tubular spirit levels in the plane of the target plate, which are designed for determining the horizontal orientation of the target plate. According to the invention the target plate itself must not necessarily be aligned horizontally over the ground mark, but alternatively, according to the invention a measurement value of the spirit level in an image of the target plate acquired by a measuring camera unit can be automatically read off or evaluated. The visual construction of the spirit level can be specifically designed for readability with a camera. A target plate with a known instrument combination, which forms a circular spirit level and a compass in one, is an alternative embodiment according to the invention.

One embodiment of the invention can also be implemented as a system which consists of a module according to the invention and a target plate according to the invention.

One embodiment of the invention can also relate to a system consisting of a stand with a built-in module in accordance with the present invention, preferably in the form of an integrated unit. Another embodiment of the invention can also relate to a system consisting of a surveying device with a built-in module in accordance with the present invention. In the same way, one embodiment of the invention can relate to a system consisting of a stand, a module according to the invention and a surveying device, optionally with an additional, external operating unit.

The various embodiments of the invention can also be implemented as a system consisting of one of the embodiments of the module according to the invention and a target plate, which target plate has a visual pattern, and a cut-out, preferably arranged essentially centrally on the target plate, or an at least partially transparent window, which is designed so as to be placed, preferably centrally, on the ground mark in order to highlight this in the image of the measuring camera and/or to enable it to be measured by image processing in accordance with the visual pattern. Accordingly the invention also relates to a target plate designed in such a way for marking a ground point, which has a visual contrast pattern and a cut-out or a viewing window for placing on the ground point, in particular if said target plate is designed for localization with a module according to the invention. The target plate for marking a ground point can be equipped not only with a pattern defined for the camera but also with a compass, e.g. a standard magnetic needle compass, so that both the pattern as well as a compass direction are visible in the image of the camera. For example, directly from the camera image it is possible:
  on the basis of the known dimensions of the pattern and its scaling in the camera image to make a height measurement between the target plate and camera using the camera,
  on the basis of a relative position of the pattern in the camera image to measure a lateral offset relative to the target plate,
  on the basis of a relative orientation of the pattern in the camera image to measure an orientation relative to the target plate,
  on the basis of an image of a measurement of the compass on the target plate, for example by means of an orientation of a compass needle visible in the image, to determine the direction of true north.

Optionally, the target plate can also be implemented with an inclination measuring device, e.g. a circular spirit level (or one or more tubular spirit levels) on the target plate, and using an image of a location of a spirit level bubble a piece of inclination information can be determined, which can be evaluated further, in particular together with a perspective distortion of the pattern.

Some aspects of the present invention also relates to a method for localization of a surveying device which is positioned on a stand above a ground mark, in particular using a stand-alone module according to the invention between the stand and the surveying device. The method comprises at least recording an image of the ground under the stand with a measuring camera in the module, identifying a ground point in the image and measuring the ground point in the image, and detecting an inclination value of the module in at least two axes in relation to a horizontal or vertical direction using an inclination sensor in the module. In the process, in particular, the image of the measuring camera unit may be evaluated at least partially automatically with an electronic image processing procedure and/or an artificial intelligence algorithm, and the ground mark or a known target plate marking the latter can be measured and evaluated in image coordinates, size and/or proportions.

The method of some aspects of the invention comprise calculating an at least partial localization of the module with respect to the ground mark, based on at least the measurement of the ground point in the image and of the inclination value by means of a localization unit in the module, and on a direct or indirect, preferably wireless communication of the localization and/or the raw data determined by the module for the localization to the surveying device, by means of a communication unit in the module.

An embodiment of the method can also comprise measuring an inclined distance from the module to the ground point, which is carried out with a distance-measuring laser pointer that can be aligned to the ground point using an alignment unit directional. This inclined distance can then be included in the localization, in particular with a calculation of a vertical normal height of the module above the ground point based on the inclined distance and the inclination information, and/or calculation of a horizontal lateral offset of a vertical axis of the module relative to the ground point. The method can also comprise determining an azimuthal compass orientation with a compass unit in the module, which azimuthal compass orientation is included in the localization.

In one embodiment of the method according to the invention the ground mark can also be marked with a target plate, which target plate is implemented with known visual features in such a way that with the measurement of the visual features in the image of the measuring camera a relative position between the measuring camera and the ground mark can be determined in at least three degrees of freedom, and wherein the localization of the module is carried out completely or at least in part based on this relative position. If the target plate additionally comprises a compass, the camera is capable of completing the localization with regard to magnetic north and hence grid north.

A module applied according to the invention can comprise specifically:
  a measuring camera for imaging the ground surface of the installation site and a ground point on the surface for referencing the installation in an external coordinate system, and an inclination sensor with at least two, preferably essentially orthogonal measurement axes.

Optionally, the module can also have a laser pointer or laser plummet for targeting and/or surveying the ground point, and/or a magnetic or gyroscopic electronic compass module.

In addition, an optional target plate can be added which has a dimensioned pattern, so that the measuring camera can determine the angular distance directly from the camera image and with the inclination information of the inclination sensor determine the vertical distance defined in the gravity direction. In a further embodiment of the target plate a magnetic compass in the plane is introduced into the target plate, so that the camera can directly determine the direction of north, or the module according to the invention has an internal electronic magnetic compass for this purpose. In adverse light conditions the module can also optionally be implemented with a lighting device, such as a white-light LED lighting system or a flashlight, which sufficiently illuminates the measuring field of view of the camera when required.

An example of a workflow for the installation of a surveying device, in other words, can proceed roughly as follows:

a stand with the module according to the invention and the surveying device is set up approximately above a ground point to be used as a reference. In setting up the stand a manual centering, achievable within the conditions available to the user without accurate external resources and without fine settings and without taking a long time, is aimed for. In other words, the user sets up the stand with the module according to the invention and surveying device above the desired ground point by eye, which quite possibly will allow deviations from a precise centering in the centimeter or decimeter range.

A measuring camera in the module according to the invention then takes a picture of the ground. The module can be optionally implemented with a lighting device, such as a white-light LED lighting system or a flashlight, which illuminates the field of view of the measuring camera, especially in order to obtain a sufficiently good image from the measurement camera even in adverse lighting conditions. In addition to the visible spectral range, the measuring camera can alternatively or additionally also capture a non-visible range.

The image of the camera is displayed on the surveying device and/or on an external operating unit (such as a tablet PC, smartphone, laptop, etc.). The desired ground point can be automatically identified and highlighted in the image (for example, by means of image recognition software), manually selected or picked and highlighted in the image, or selected semi-automatically with a mixture of automatic and manual highlighting. The coordinates of the ground point are then known in the local coordinate system of the viewing field of the camera and thus also in the local coordinate system of the module according to the invention.

A laser pointer, laser plumb line or laser-plummet of the module according to the invention then aligns its laser beam onto the selected ground point. For example, a small mirror can pivot the optical axis of the laser beam relative to the module according to the invention. Such a pivoting can be preferably carried out with a motorized drive, but also in a reduced embodiment optionally by actuator units operated manually by the user. In this case, the alignment of the laser pointer on the ground point can optionally be monitored by the user in the image of the camera or by direct observation of the light spot on the ground. In particular, an exact targeting of the ground point with the laser beam can be carried out to by means of camera information. A direction of the deflection is detected by an evaluation unit, preferably with an evaluation of a position of the point of incidence of the laser beam in the camera image, but optionally also by detecting the position of the deflection unit with a corresponding encoder or sensor.

The laser pointer or the laser plummet is implemented in the form of an electro-optical distance meter (EDM, Rangefinder), with which an inclination distance between the module according to the invention and the ground point can be determined. The distance can be determined using the preferably visible laser beam by means of the laser pointer, for example using a transit time and/or phase measurement principle, such as described in EP 1 882 959, EP 2 680 028, EP 3 070 494, EP 3 324 203 or elsewhere.

By including inclination information from an at least two-dimensional inclination sensor (e.g., a MEMS acceleration sensor or similar) in the module according to the invention, from the measured inclination distance a vertical height of the ground point relative to a height reference point (in particular, the pivot point) of the module according to the invention (e.g. the upper mounting plate) can be determined as the positioning height.

Optionally, it is also possible, for example if the distance meter combined with the laser pointer cannot capture the inclination distance sufficiently accurately (for example due to dirt, water, reflections, ambient light, etc.), or if this option is considered more convenient, a marking plate can be placed centrally on the ground point. By using such a marking plate with a known geometric design and marking, with the image of the camera alone, and based on the known pattern on the marking plate, both distance, height, length and width in the local coordinate system of the module according to the invention can be evaluated. From these data, in turn the height in the vertical direction can be determined using the built-in inclination or tilt sensor. In this case the relative offset to the ground point in the external coordinate system is initially only defined as a radius.

In one embodiment of the module according to the invention with an optional compass system, such as a magnetic or gyroscopic electronic compass unit, this information can also be captured, so that the installation of the surveying device in an external coordinate system is already defined in up to six degrees of freedom, without the need for measurements to be performed using the surveying device itself. Therefore the complete position coordinates (E,N,H) can be determined, where E=east, N=north, H=height specify the location of the surveying device in an external reference coordinate system or global coordinate system, to which reference is made via the ground point. Optionally, the target plate itself can have a non-powered magnetic compass unit, wherein the compass needle is visible from the camera, so that in the image the direction of north can be directly determined.

In a first embodiment with a manual tribrach, mounted on the module according to the invention between the module according to the invention and the surveying device, the surveying device can then be further vertically adjusted in order to achieve the still absent leveling of the surveying device. The surveying device can then, if necessary, be determined the azimuthal north direction exactly by means of a compass or by measuring fixed points in the environment. Using wireless communication the measurement results determined in the module according to the invention and/or other installation data are then provided to the measurement unit.

In a second embodiment of the module according to the invention with an integrated tribrach, the surveying device with the integrated adjustment mechanism can be vertically adjusted in order to achieve a leveling. The 6-DOF determination of the positioning is carried out as has already been described above. The 6-DOF coordinates of the positioning of the integrated tribrach relate, for example, to the relative position of the ground point to the pivot point of the module according to the invention, wherein this pivot point can be, for example, the axial point in the installation plane of a surveying device holding apparatus of the upper mounting plate of the module.

The module according to the invention can optionally also capture other features and attributes of the ground point. For example, an image of the ground point of the camera can be captured, if possible together with the associated measurement values. Any visual markers, encodings or labels of the ground point can be stored and/or automatically evaluated.

The module according to the invention can then, using a corresponding communication interface (e.g. wirelessly via NFC, Bluetooth, WLAN or similar), provide the positioning data to the surveying device, an external operating unit, a cloud or fog computer system and/or a BIM database, which can also optionally store these data and images. For example, the module according to the invention can determine and provide positioning parameters such as offset (E and N), and height (H) in relation to the ground point and/or the necessary raw data to determine them, which can then be further processed by software running externally to the module according to the invention. In one embodiment, for example, the module according to the invention and the surveying device could provide their raw measurement data—if necessary, together with their current system configuration data, environmental data, etc.—directly to the cloud, wherein the transformation to an external reference coordinate system and/or further evaluations are then carried out externally by a cloud computer system. The results of this can be provided to the user, either via the surveying device or an external computer system. Then from the cloud system, for example, tasks can be performed such as automated documentation systems, automatically generated reports, networking with other data (for example, a BIM database), automatic target/actual comparisons, artificial intelligence systems for fault detection and for plausibility checks, automatic device configurations and calibrations, provision of specific user guides for operating the devices, remote control of the devices by software on the cloud computer or using software components, parameters or measurement sequences provided thereby, remote control of the devices or support for device operation by external specialists, not present on-site, etc.

This communication interface can also be used to carry out the control, configuration, calibration and parameterization of the module according to the invention, so that this does not necessarily need to be implemented with a local user interface, or the latter can be reduced to a minimum (such as a power switch and status light). Via the communication interface the images or video from the camera can also be transferred, for example. In one embodiment, for example, a web-based or ReST interface, a JSON, XML, YAML, BLE-GATT (LNP/LNS) data transfer, etc. can be provided.

The present invention or parts thereof could also be in the form of a computer program product with program code which is stored on a machine-readable medium or a computer data signal, embodied by an electromagnetic wave (e.g. in the form of a wireless data transmission), for implementing at least parts of the method according to the invention. In this case, the program code can specifically comprise those steps which perform control of sensors and/or actuators, processing and calculation of measurement values and results, provision of user interfaces and/or APIs. This is particularly true if the program code is executed in a subscriber of the measurement system.

BRIEF DESCRIPTION OF THE DRAWINGS

The method according to the invention and the device according to the invention are described in more detail below on the basis of specific exemplary embodiments shown schematically in the drawings purely by way of examples, wherein further advantages of the invention will also be discussed. Individually, they show:

FIG. 8 a representation of exemplary components in a first embodiment of the invention;

FIGS. 9*a*, 9*b* and 9*c* a representation of exemplary variants of a second embodiment of the invention;

FIG. 10 a block diagram of an example of one embodiment according to the invention of a method for positioning in accordance with the present invention.

The representations in the figures serve only for illustration and, unless explicitly specified, are not to be considered as exactly to scale. Identical or functionally similar features are, as far as practicable, labeled consistently with the same reference symbols and where appropriate are distinguished with a letter as an index. The diagrams illustrated show the basic technical structure, which can be supplemented or modified by a person skilled in the art in accordance with general principles. The expressions "essentially" or "substantially" express the fact that a feature within the meaning of the invention does not necessarily need to be fulfilled 100% accurately, but even minor deviations can occur, especially in such a way that the technical effect of the feature within the meaning of the invention is maintained and/or within reasonable tolerances and inaccuracies in the design or manufacture.

DETAILED DESCRIPTION

Figure 1:
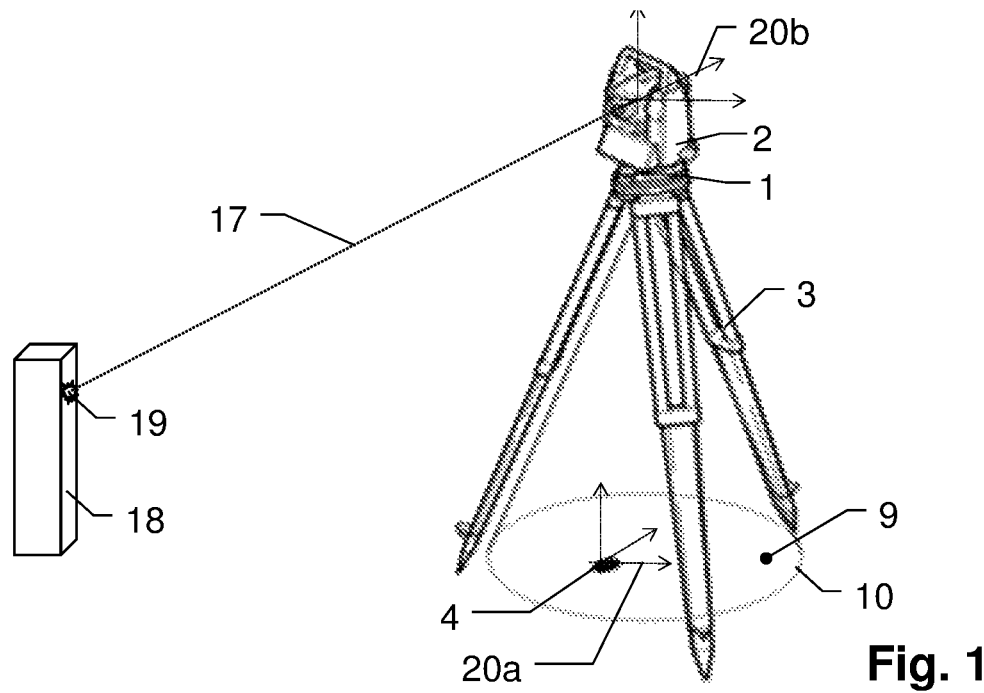
FIG. 1 a first example of an embodiment of a module according to the invention in a surveying process.

FIG. 1 schematically shows an example of an embodiment of a positioning of a mobile surveying device 2 for a measurement task, for example in surveying, on a building site, etc. It shows a surveying device 2 which is usually only temporarily set up in the field with a stand 3 or other frame in order to carry out a measurement task, e.g. for taking a current inventory or for determining, staking out and/or marking target positions or orientations.

In the example shown, the surveying device 2 is designed as a total station, which in relation to a surveying device coordinate system 20*b* performs a measurement at one or more measurement points 19 on one or more objects 18 or a reflector, by targeting these measurement points 19 with a laser target axis 17 of an electro-optical distance measurement device (DMM) by means of movable device axes of the surveying device 2. In other embodiments, however, the surveying device 2 can also be designed differently, for example, as a theodolite, tachymeter, laser scanner, laser tracker, GNSS receiver, leveling or rotation laser, etc. and/or also using other measuring principles for the determination of a measurement point 19.

In order to establish a reference to an external coordinate system 20*a*, the surveying device 2 must be localized relative to the latter, which means that a known relation must be established between the surveying device coordinate system 20*b* and the external coordinate system 20*a*, or this relation must be determined in dimensional units. As in the example shown, such a localization is often produced using marked ground points 4, for example, measurement markers, colored markers, concrete anchors, ground pegs, etc. The surveying device 2 is positioned above the ground point 4, thus erected with the stand 3, for example. A geometric relation to the ground point 4 is measured, for example, with at least one vertical height and one two-dimensional horizontal offset of the perpendicular of the surveying device 2. In particular, it is no longer absolutely essential to establish a precise physical positioning of the surveying device 2 above the ground point 4, in which a perpendicular of the surveying device 2 passes exactly through the ground point 4. In other words, the localization is equivalent to a transformation in 6 degrees of freedom (6 DOF) between a ground point 4 and the pivot point as the point of origin of the local coordinate system of the surveying device 2. The angular orientations of the localization are defined by the gravitational normal and, for example, by the azimuth relative to north.

In an embodiment according to the invention, a stand-alone module 1 according to the invention is situated between the stand 3 and the surveying device 2. This module 1 according to the invention is designed so as to establish a localization of the surveying device 2 relative to the ground point 4, i.e. to determine dimensions between these two, or the module 1 according to the invention represents a tool for such a localization. The module 1 according to the invention placed between the two defines a new, additional pivot point relevant to the localization of the module 1 according to the invention, which is positioned at a known height difference from the pivot point of the surveying device 2. The pivot point of the surveying device 2 is usually the intersection point between the tilt axis, vertical axis and target axis of the surveying device 2. In the case of a vertical installation (which is always assumed) the pivot point of the module 1 is preferably located exactly perpendicularly a known distance below the pivot point of the surveying device 2. Since the module 1 is stand-alone, i.e. not necessarily a fixed part of the surveying device 2 or the stand 3, this can e.g. also be easily retrofitted and/or used with different surveying devices 2 and/or stands 3. Stand-alone can also mean specifically that the module 1 is self-contained and preferably ready for operation without additional external components, i.e. in particular has an internal power supply, for example, and can perform its function via a communication and/or control interface. The module 1 can be specifically an independently transportable, detachable device, which is neither an integral part of the stand 3 nor the surveying device 2. For example, via a wireless data interface the functionalities of the module 1 can be controlled from an external operating unit, specifically, for example, via an operating unit of the surveying device 2 and/or an external computer, tablet PCs or smartphone, etc.

The module 1 has an image capture device or measuring camera 25, whose field of view 10 in the mounted condition, thus in the usage position of the module 1, is directed towards the ground 9 under the stand 3, i.e. in particular it is aligned in such a way as to capture a ground point 4 under the stand 3 in a two-dimensional image.

Figure 2:
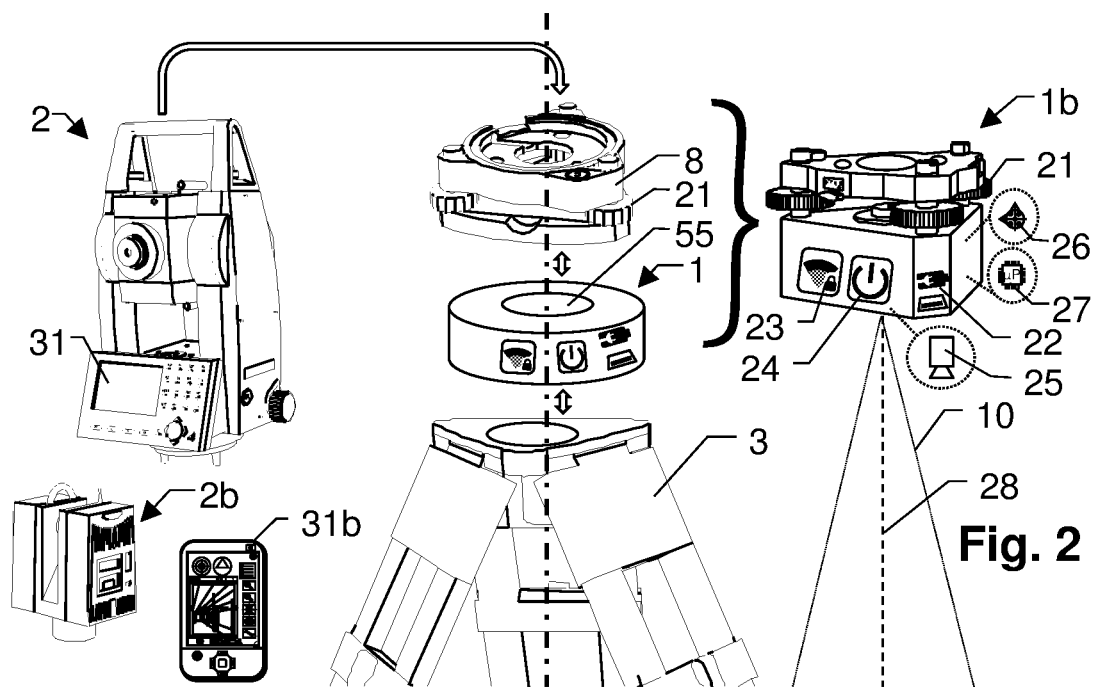
FIG. 2 two embodiments of modules according to the invention in their application.

Some details of exemplary embodiments of a module 1 according to the invention, as well as examples of their structure, arrangement and use are shown in FIG. 2.

In the example of a specific embodiment of a module 1*b* according to the present invention, this can also be implemented with a mechanical design similar to a standard mechanical tribrach 8, and thus replace the latter—which is illustrated on the right in the figure.

In the example of another specific embodiment of a module 1 in accordance with the present invention, the module 1 can also be implemented without the mechanical leveling functions of a tribrach 8 however, thus as a solid, rigid module 1, for example, which is attached e.g. between the stand 3 and a standard tribrach 8—a situation which is illustrated in the middle of the figure.

In a minimal embodiment according to the invention, a module 1 according to the invention can have, for example, only one digital measuring camera 25 as sensors in its housing and an inclination sensor 26, for example in the form of a 2D-tilt MEMS, having a measurement accuracy in the range of seconds of arc or less. In addition to these sensors there is also an energy supply 22 (e.g. in the form shown of a preferably rechargeable battery), a communication unit 23 (e.g. in the form shown of a Bluetooth, WLAN, cellular or NFC radio module) and a control unit 27 (e.g. in the form of a microprocessor or other preferably programmable computer unit shown).

The measuring camera 25 can be specifically a camera module, which has known imaging properties, so that measurements in the camera image can be carried out with a sufficient degree of accuracy. This can be carried out firstly with a sufficiently precise optical system of the camera unit with low and preferably known optical errors, and additionally or alternatively also with an appropriate numeric camera calibration of the camera 25 and its imaging characteristics, which is applied to the image in order to establish a relation between the pixels of the camera 25 and positions in the object space. In particular, particular attention should be paid in the design to stability or long-term stability of the optical image, or else a simply executable, preferably automatic (re-)calibration process can be provided. An a simple embodiment of the invention, the measuring camera can be embodied in a module according to the invention with an accurate and stable set of optics as a fixed focus lens, wherein this lens is specifically designed with a high-resolution focal range between 50 cm and 5 m.

In one embodiment as shown here, the measuring camera 25 can be designed specifically as a central measuring camera 25, which has its field of view 10 directed through the stand 3, e.g. through a central hole in a heart screw, with which the module 1 according to the invention can be secured to the stand 3, in the direction of the ground under the stand 3. However, in hollow heart screws with the widespread imperial ⅝ inch Whitworth threads, or metric M16×2 or M16×1.5 threads and with an outside diameter of less than 16 mm, the central holes are often so small that they can restrict the field of view of a central measurement camera.

In an embodiment shown and described later the module 1 according to the invention can alternatively or additionally also have a measuring camera 25 in the form of an off-center or peripheral measurement camera.

The module 1 according to the invention here has a device with which an inclination of the module 1 can be determined in at least two axes with respect to the horizontal or vertical as an inclination value, preferably as a digital measurement value with an accuracy in the range of seconds of arc. Such an internal inclination sensor 26 is explicitly illustrated in the case of variant 1b.

The module 1 according to the invention also has a control unit 27, e.g. with a programmable microcontroller or microcomputer, which is designed to control sensors and/or actuators of the module 1 and/or to process their sensor values and data. Via a communication unit 23, e.g. a radio module according to a common standard, the module 1 can with the surveying device 2 and/or with an external operating unit, which can be designed, for example, as a stand-alone operating unit 31b and/or as an operating unit 31 integrated in the surveying device 2. In addition, for an autonomous operation of its internal sensors and functionalities the module 1 has a power supply 22, and can also have operating elements and display elements such as those shown under 24 et al.

In extended embodiments according to the invention the previously mentioned 'minimal setup' according to the invention can be extended with corresponding additional and/or more accurate sensors and additional functions, in particular with combinations of parts of the variants and options of a module 1 according to the invention described in the following.

A further (shown on the right) exemplary embodiment of a design of a module 1b in accordance with the invention can also have a leveling mechanism 21, in particular similar to a standard tribrach 8, as an integral part of the module 1. In the example shown, for example, a user can perform, for example using the three adjusting screws 21, a levelling of a surveying device 2 or 2b mounted on the module 1b. Thus, this embodiment can be used as a kind of intelligent, enhanced replacement of a standard tribrach 8. Particularly in the case of such an integration of a tribrach mechanism 21 in the module 1 according to the invention a compact design can thus be achieved, with which the user does not need to carry and install additional physical components as was previously the case, but which nevertheless enables easier positioning. In addition, the azimuth angle between module 1 and surveying device 2 can be fixed, for example, specified by means of special support and positioning pins, preferably with an angular accuracy of better than one minute of arc. The calibration of the camera 25 with its imaging optics relates to the local coordinate system of the module 1, wherein, for example, the three coordinate axes cross at the pivot point in a support plane for the surveying device 2 and the azimuth angle can be fixed (e.g. by means of a positioning pin or a marker as an interface of the orientation to the surveying device).

In an example of a variant (illustrated on the right) of such an embodiment, the module 1 can additionally have a simple, non-measuring laser plummet 28, e.g. in the form of a laser pointer. This laser pointer 28 can preferably be designed in so as to be directed through the heart screw of the stand 3 onto the ground. In one embodiment of the laser pointer 28 it can be a distance or range-measuring laser pointer or laser beam pointer 28, with which a distance between the module and the point of incidence of the light of the laser pointer 28 can be determined.

In an example of another variant (shown in the middle) of such an embodiment the module 1 can have a free opening 55 in the middle along the vertical axis, in order to display the point of incidence of the vertical axis on the ground directly and/or to measure the height of the surveying device 2 above the ground using a laser plummet or distance-measuring laser plummet or perpendicular laser beam already integrated in the surveying device 2.

In embodiments, in which both sensors, the central measuring camera 25 and the height-measuring laser plummet 28 operate through the central tightening bolt, the optical axes of these can be projected on top of each other, e.g. by means of a dichroic beam divider. In another variant according to the invention, if required one of the above two sensors can be temporarily reflected or moved onto a common axis, e.g. by means of a pivoting adjustable mirror or movement of at least one of the measuring camera 25 or laser pointer 28, in particular if laser pointer 28 and measuring camera 25 are not provided for use simultaneously, but sequentially.

In an extended embodiment the module 1 according to the invention can also be designed with a deflection device for the laser pointer 28, by means of which without movement of the housing of the module 1 a targeting of the ground point 4 with the laser pointer 28 can be performed—even at an angle. The deflection direction can be moved manually or using motors. In a specific embodiment the measuring camera 25, laser pointer 28 and inclination sensor 26, which are mounted at fixed positions relative to each other, can be moved jointly relative to the housing of the module 1 by the deflection unit.

In particular, the module 1,1b according to the invention can be designed as a standalone accessory instrument to geodetic and industrial equipment, in particular not permanently integrated in a surveying device 2 or stand 3. The module 1 according to the invention is therefore very versatile and can be used for different surveying devices 2,2b without special modifications, for example, even for simpler low-grade TPS or other surveying devices 2 which are equipped with a compatible wired or preferably wireless communication interface 23, or in which such an interface can be retrofitted.

Figure 3:
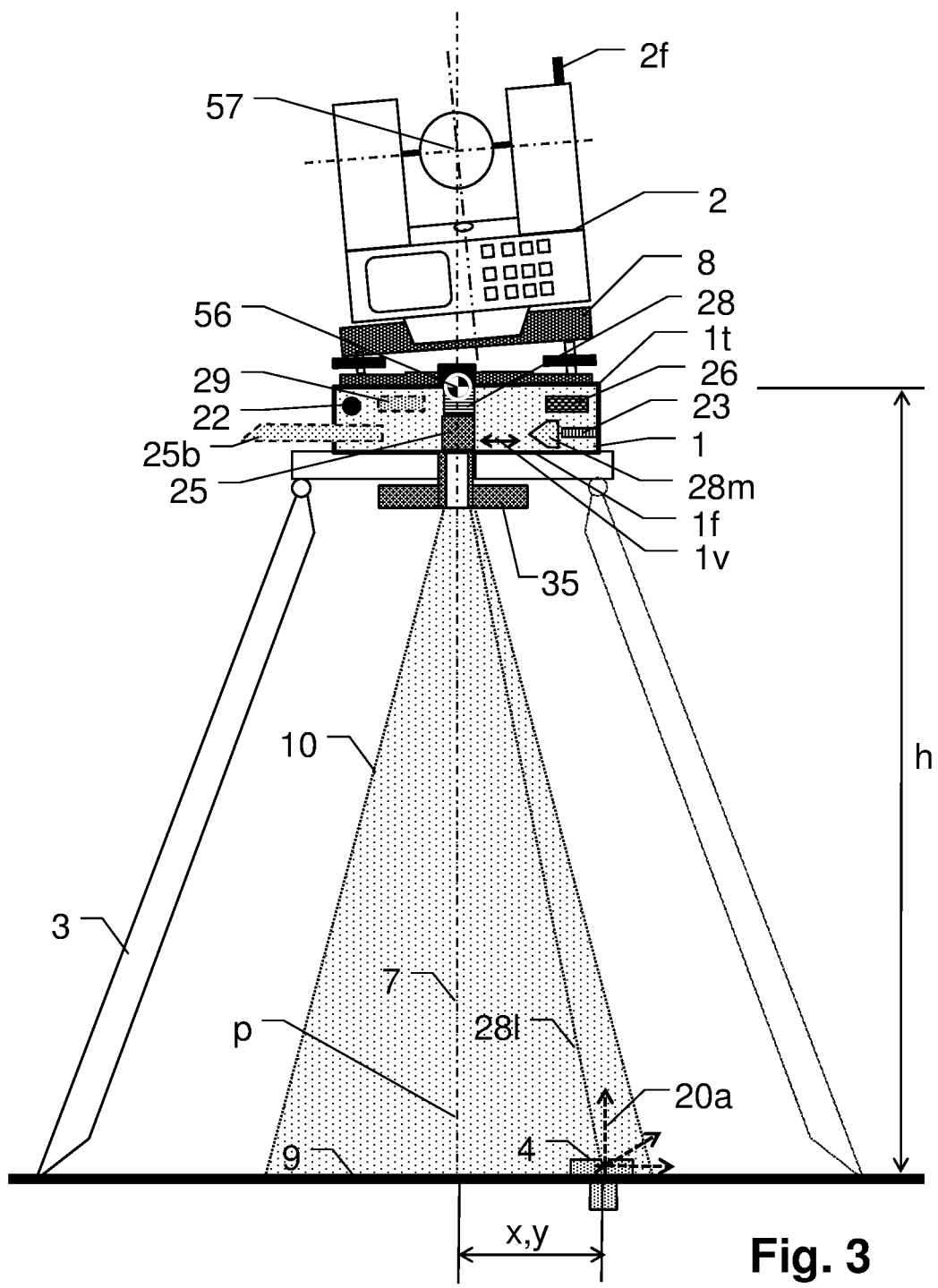
FIG. 3 a first example of an embodiment and functionality of a module according to the present invention.

In FIG. 3 another example of an embodiment of a module 1 according to the invention is shown. This is designed to be installed, so to speak, as a sandwich unit between a standard stand 3—tribrach 8 arrangement. The surveying device 2 can therefore also be leveled in a known manner using a well-known, separate tribrach module 8 on the module 1 according to the invention. In particular, the module 1 provides the necessary devices to determine the vertical direction p, offset x,y and height h of a pivot point 56 above a ground point 4, and thus to simplify the localization of the surveying device 2 (or of a measurement device coordinate system 57) in relation to an external coordinate system 20*a* or to establish this relationship. The stand 3 may, but need not necessarily, be placed on the same ground 9 on which the ground point 4 is located.

The module 1 can be designed in such a way that it can be attached to the stand 3 with its lower mounting plate if via a central screw or heart screw 35, in particular in the same or a similar way as the tribrach 8 is traditionally directly attached to the stand 3. For example, the lower mounting plate if can have an internal thread, which can preferably be arranged essentially centrally on the module 1.

The tribrach 8, in particular the same tribrach 8 such as could be used even without the module 1 according to the invention, can then be attached to an upper mounting plate it of the module 1. For this purpose the module 1 can also have a screw, for example a threaded stud or a threaded hollow cylinder on the upper mounting plate it, which can preferably be arranged essentially centrally on the module 1 and aligned with the internal thread. To transfer the azimuthal orientation of the module 1 to the tribrach 8 and thus to the surveying instrument 2, a marker or a mechanical stop can be provided in the upper mounting plate so that the azimuthal axes of the module coordinate system (e.g. of the pivot point 56) and of the surveying device coordinate system 57 are aligned relative to each other, preferably with an accuracy of an order of magnitude of approximately 10 minutes of arc or less. In embodiments in which a north direction in the surveying device 2 and the module 1 according to the invention are known by other means, e.g. by means of a built-in compass and/or are targeted on known fixed points, such markers or mechanical stops can be omitted if necessary.

With the tribrach 8 as a horizontal leveling device the surveying device 2 can then be aligned sufficiently horizontally (as usual).

All embodiments of the module 1 according to the invention are designed with at least one measuring camera 25. This measuring camera 25 can be placed on the central axis as central measuring camera 25. The measuring camera 25, in particular its imaging characteristic, mounting position and optical path, can be specifically designed and configured for the measurement of relative coordinates of the module 1 according to the invention to the ground point 4. In one exemplary embodiment, the measuring camera unit 25 in the module 1 according to the invention should be designed, for example, such that it sharply images the ground point 4 at a distance of approx. 1.5 m to 4 m (e.g. as a rough stand height above the ground) and can measure to an accuracy of approximately 1 mm in at least two, preferably in three dimensions.

This can be aggravated in some stands 3 by the fact that the stand 3 only has one opening exactly in the middle, through which both the camera 25 and a preferably height-measuring laser pointer 28 must have a clear view to the ground 9 under the stand 3. The size of the field of view 10 of the camera 25 can be functionally limiting, since an extended central tightening screw 35 in the stand 3, in particular, can limit the field of view 10 of the measuring camera 25 in size, and thus the freedom in the positioning relative to the ground point 4 is restricted to this limited field of view 10, which in some configurations can be entirely acceptable, but not in others (e.g. in the case of very low positioning heights, etc.).

In another embodiment therefore, one measuring camera 25*b* can be placed laterally offset from the center as peripheral measuring camera 25*b*. For example, placed laterally offset by at least approximately 8 cm relative to the heart screw 35, in order to guarantee a free line of sight next to the carrier plate or shoulder of the stand 3 to the ground 9 under the stand 3. Other embodiments according to the invention can also be designed with two or more measuring cameras 25,25*b*, in particular, for example, with a central measuring camera 25 and at least one peripheral measuring camera 25*b* in the module 1 according to the invention.

The module 1 according to the present invention can determine the coordinates or location of the module 1 above the ground point 4—or appropriately converted, those of the tribrach 8 mounted thereon or of the surveying device 2—or provide the raw data necessary for such a determination. In particular, a vertical positioning height h of the surveying device 2 above the ground point 4, as well as a lateral offset x,y in two dimensions between the ground point 4 and a standing or vertical axis, or a perpendicular to the surveying device 2 can be determined. If an adjustment unit on the tribrach 8 is not designed in such a way that its height does not change during adjustment (such as would be the case with a movement on a dome or similar), then—in order to obtain accurate height information—a height between pivot 56 and pivot 56, or any deviation on the adjustment unit can be determined and provided as a parameter.

Together with orientation information relative to north, which orientation in one embodiment of the module 1 can be determined with a compass 29 integrated in the module 1, but also alternatively using a compass on the ground 9 in the field of view 10 of the measuring camera 25 or 25*a* or via the surveying device 2, coordinates of the tribrach 8 in the external coordinate system 20*a* in which the ground point 4 is measured can be determined in up to six degrees of freedom. In particular, as mentioned above, the azimuthal orientation can be referenced in the mounting of the surveying device 2 and module 1, or each of the two determines the north direction for itself, e.g. in accordance with one of the above-mentioned variants.

According to the invention, specifically a relative position or location of the module 1 according to the invention can therefore be determined relative to any ground point 4, or, in the case of suitably known offset data of the fixing unit used, also the relative location of the surveying device 2 mounted on the module 1.

This can be carried out in accordance with the invention, in particular, in such a way that the surveying device 2 does not require special additional electronic or mechanical components that would increase its complexity. At most a communication interface 2*f* is required on the surveying device 2, with which a data exchange with the communication unit 23 of the module 1 according to the invention can be established, and optionally a corresponding software module on the surveying device for communication, data processing and/or operation of the module 1 according to the invention via these communication interfaces 23 and 2*f*. Alternatively, a communication of the module 1 according to the invention can take place as already shown but also via an external device, such as a mobile operator terminal or a tablet PC. Alternatively or additionally, the communication can also take place directly or indirectly with an external cloud system 32 shown in FIG. 4, in particular a cloud computing and/or cloud storage system. This process preferably uses a wireless data communication.

In particular in the case of wireless data communication the module 1 according to the invention is equipped with a dedicated power supply 22, e.g. with a battery or rechargeable battery. A module according to the invention can be designed in such a way that its energy consumption is minimized, for example by sensors and functionalities of the module 1 being enabled only briefly during the actual measurement with the surveying device 2, in particular during the positioning and/or at most any subsequent verification of the positioning, but for the major part of the time being switched off or in standby mode.

Such a possible subsequent verification of the positioning can be carried out, for example, in order to monitor movements of the stand 3 over time. For example, one or more sensors of the module 1 according to the invention can be activated cyclically or sporadically—e.g. triggered by the module 1, the surveying device 2 and/or a user. If the stand 3 sinks or shifts, for example, this can be detected from changes in the data of the inclination sensors 26, the measuring camera 25, an optional distance-measuring laser pointer 28 and/or a compass 29. Such a change can then trigger, for example, a warning or alarm signal, and/or a preferably automatic re-determination of the location by the module 1 according to the invention. For example, the module 1 can be activated, for example, at 5-minute intervals, whereupon it briefly checks the coordinates, i.e. in particular compares, e.g., the two angles tilt-x and tilt-y and if necessary, the north alignment with a compass 29 with previous measurements of these sensors, or compares a current image of the measuring camera 25,25a with a previous one, in particular as will be described again in the following.

The said two angles tilt-x and tilt-y can be detected by an at least two-dimensional inclination or acceleration sensor in the module 1 according to the invention, which is designed to detect an inclination value of the module 1 relative to the horizontal and/or vertical in at least two directions.

In the example shown of an embodiment of a module 1 the measuring camera 25 is arranged in such a way that the field of view 10 thereof is directed through a central hole in the heart screw 35 onto the ground 9. In an image of this measuring camera 25, a ground mark 4 located under the stand 3 can be detected, and preferably a position of the ground mark 4 in this image can be measured in its image coordinates.

In order to also be able to emit a preferably distance-measuring laser plummet or laser pointer 28l through this central hole in the heart screw 35 towards the ground 9, in the variant of an embodiment shown, as illustrated with the arrow 1v the camera 25 or its field of view 10 can be designed to be movable. Thus, in this variant either the laser pointer 28l or the measuring camera 25 can have a clear view through the opening in the screw 35. In an alternative embodiment conversely, the measuring camera 25 or its field of view 10 can be fixed and the laser pointer 28 or the laser pointer light beam 28l can be movable. In particular, if the laser pointer 28 or a deflection unit for the laser pointer 28 is provided so that its light beam 28l is already designed to be movable to target the ground mark 4 with the laser pointer laser beam 28l outside of the normal 7, the measuring camera 25 can thus remain fixed and the already movable laser pointer 28 can be steered into the opening of the central screw 35 only when necessary.

In one embodiment the laser pointer 28 can be designed without a distance-measuring function, as a simple laser pointer for targeting the ground point 4, or in another embodiment as a distance-measuring laser pointer 28, in which an electro-optical distance measurement 28m to the targeted ground point 4 is carried out. Using the determinable angular distance of the beam 28l that can be determined in this case (as scaling information to the ground point 4) together with the inclination information items, the vertical positioning height h above the ground point 4 can be determined. The deflection information of the laser plummet light radiation 28l in this case is known, as the laser beam has been determined by means of a prior image analysis of the location of the ground mark 4 in the image of the measuring camera 25. Optionally, deflection information of a deflection unit for the laser plummet light radiation 28l can be incorporated, e.g. using appropriate sensors of the deflection unit, such as encoders, inclination sensors, etc., and/or an incidence point of the laser plummet light radiation 28l on the ground 9 or on the ground mark 4 can be captured by the camera 25, e.g. in camera coordinates, and evaluated.

Alternatively, the measuring camera 25 can also be designed as a range imaging camera (RIM), for example, wherein the photosensitive elements thereof, at least in part, are designed so as to carry out a distance measurement according to a transit-time or phase measurement principle of emitted light pulses of a laser beam 28l.

Figure 4:
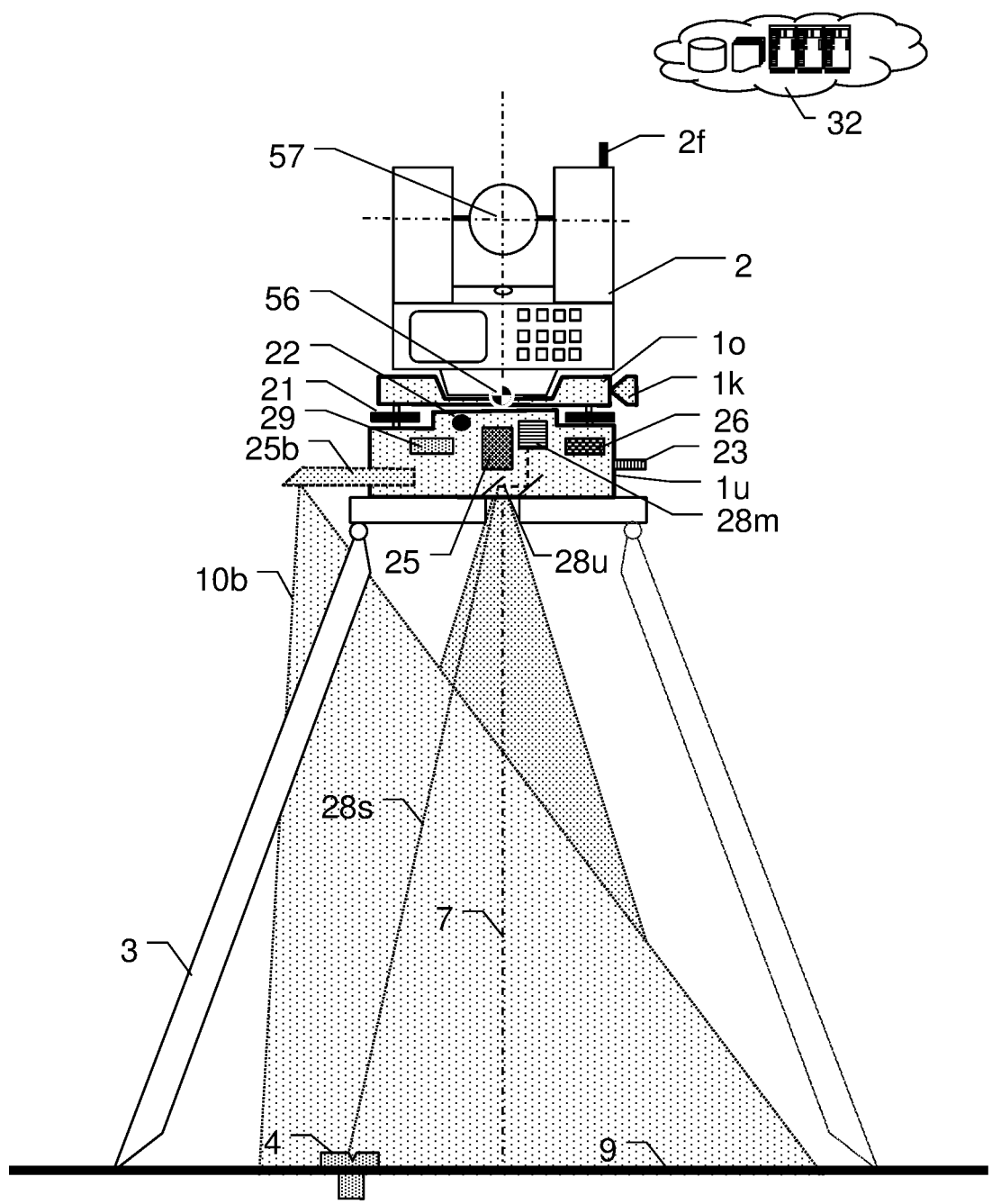
FIG. 4 a second example of an embodiment and functionality of a module in accordance with the present invention.

FIG. 4 shows an example of alternative embodiments and variants of a module 1 according to the invention, in which the module 1 has an adjustment device 21 as an integral part, which is identical or similar to a standard mechanical tribrach 8 for leveling a mounted surveying device 2. An external tribrach 8 is therefore no longer required and the module 1 can therefore replace a standard tribrach 8, since the module 1 according to the invention is designed as a tribrach. This embodiment of the module 1 thus has a lower part 1u for mounting on the stand 3 and an upper part 1o that can be mechanically leveled using actuating devices 21. This could also prevent any errors and inaccuracies in the assembly of a separate tribrach 8. In particular, the actuating devices 21 can be designed such that the distance between the pivot point 56 of the module 1 according to the invention and the pivot point 57 of the surveying device 2 does not change during the leveling, or any change that does occur can be recorded and taken into account. The surveying device 2 can then be placed, for example, directly on the module 1 according to the invention by means of clamping device 1k, in particular a highly accurate and fixed-orientation rapid tensioning device.

In this extended embodiment the module 1 according to the invention again comprises all the necessary components to determine vertical direction, offset and height above a ground point 4. Optionally, again additional functionalities or variants already mentioned or mentioned here again can be present, for example, at least one of: an inclination measuring device 26, a communication unit 23 for exchanging data with a remote station 2f or a cloud-system 32, a distance-measuring or non-distance-measuring laser pointer 28 or 28m, which can be designed with or without a deflection unit 28u for its laser light, a power supply 22, a digital magnetic compass 29, a peripheral measuring camera 25b, etc.

As already mentioned, in another alternative variant or else in addition to the previously described measuring camera 25 in the central section, the module 1 according to the invention can also be designed with an optional peripheral camera 25b which at least partially captures the ground 9 under the stand 3, but the field of view of which is not, like camera 25, aimed centrally through the stand 3 at the ground 9, but past the stand head or the stand plate to the side, from the outside between the stand legs, so that the ground point 4 is situated in the field of view 10b of the peripheral measuring camera 25b. With one or more peripheral cameras it is possible that a larger field of view 10b may be covered than with a central camera 25.

With the shown distance-measuring laser plummet or laser pointer 28 shown in the module 1 the angular distance 28s to the ground point 4 can be determined. From this angular distance together with angle information about the deflection of the laser pointer from the vertical, a normal height h of the positioning above the ground mark 4 can be determined. This information can be determined, for example from inclination angle information from an inclination sensor 26 in the module 1 and/or deflection information of a laser pointer deflection unit 28u in the module 1, and/or with an image analysis of a location of the ground mark 4 in the image of the measuring camera 25. In addition to the normal height h to the ground point 4, a lateral horizontal deviation of the perpendicular or normal vertical axis or central axis 7 of the module 1 with respect to the ground mark 4 can be determined by the module 1 independently. This means that the module 1, or a surveying device 2 placed thereon, can be localized in three lateral directions with respect to the ground mark 4. Together with an azimuthal direction determined, e.g., by the inclination sensors 26 and one determined e.g. with an optional compass 29 or by measuring a known point, this localization can also be determined in five or six degrees of freedom with the module 1 according to the invention.

Figure 5:
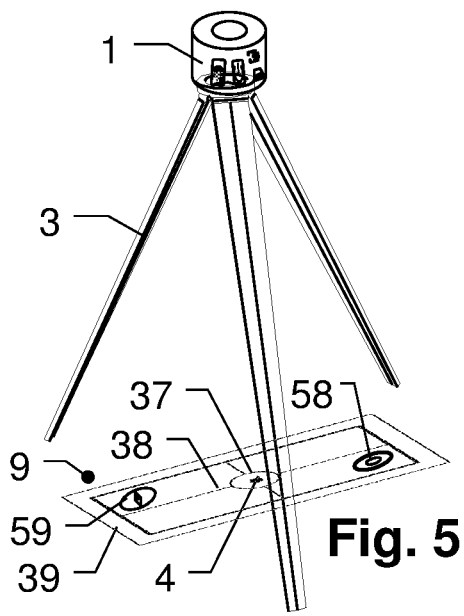
FIG. 5 an example to illustrate an embodiment and functional variant of a module according to the invention.

In the example shown in FIG. 5 of a specific embodiment of an application of the present invention, a special target plate 39 can also be used—in addition to a direct use of a standard ground mark 4 in the classical sense—to mark the ground point 4 under the stand 3. For the sake of clarity the surveying device 2 is not shown here. The module 1 can be designed according to any of the embodiments or variants described here.

An application of such a target plate 39 for a defined marking of the ground point 4 can be used, for example, if a direct measurement on the ground point 4 is not possible or presents difficulties for a distance measurement with the laser pointer 28. For example, the target plate 39 can be used to clearly mark the ground mark 4, in particular in the presence of dirt on the ground mark 4, poor visibility of the ground mark 4 on the ground surface 9, likelihood of confusion of the ground mark 4, use of a different ground marker such as a colored marking of a bolt, nail, hole, etc. in the ground instead of a standard ground mark 4, etc. But even with ordinary ground marks 4, a general application of such a target plate 39 can provide increased convenience and/or accuracy in the positioning. The use of such a positioning target plate 39 with the module 1 according to the invention with at least one measuring camera 25 directed at the ground and an inclination sensor 26, can not only be considered a specific sub-aspect or group of embodiments of the invention, but in fact as a stand-alone invention.

In the example shown, the target plate 39 can be designed, for example, as a plastic or metal panel, which has a structured visual contrast pattern 38 on its surface. The structure of the contrast pattern 38 is formed in such a way that, when being detected with the measuring camera 25 in the module 1, it is clearly detectable in the camera image 39i with high precision and is scaled and measurable in this image 39i. For example, the pattern 38 can generate a scaling of the camera picture 39i and the pattern 38 can be used as a kind of triangulation base, wherein measurements of the inclination sensors 26 are incorporated at the measuring camera 25. The target plate 39 is located essentially horizontally or at a known inclination on the ground 9.

In the example shown a white target plate 39 is shown with a (preferably dimensionally stable or with known dimensions) point and/or line pattern 38 printed in black, wherein the colors and patterns can also vary. The pattern 38 of the target plate 39 can also have or form a code, for example, similar to a QR or bar-code. In the example shown, the target plate 39 has a hole 37 or window in its center, which is placed centrally on the point 4 to be marked on the ground 9 or the ground mark 4, in order to highlight this clearly. A crosshair or similar can be formed in the hole or window 37, in order to facilitate a central placement which is as accurate as possible. The target plate 39 can optionally also be designed with attachment means, for example, with clamps, adhesive surfaces, mounting holes for screws or nails, or else at least temporarily fixed to the ground 9 with spray adhesive or by weights. In a modified minimum embodiment the target plate 39 optionally also comprises a circular spirit level 58 or two orthogonal tubular spirit levels, by means of which a horizontal orientation of the target plate 39 perpendicular to the vertical direction can be captured by the camera 25, with which, for example, the reliability and/or the accuracy of the localization can be improved or verified, at least especially in non-horizontal positions of the target plate 39. Optionally, using the circular spirit level 58 a horizontal orientation of the target plate can also be produced manually, which can be additionally verified if necessary in the camera image of the circular spirit level 58. In a specific embodiment the target plate 39 can also have one or more reflectors, in particular for the light of the laser pointer 28 and/or its distance measurement functionality. In the example shown a reflector point is centered in the hole 37 above the ground point 4, which has, for example, approximately the diameter of the light point of the laser pointer 28 or the diameter of a centered recess in the ground mark 4. Together with the module 1 according to the invention, a set of different marker panels 39 can also be provided for different applications. The calculations to be performed can be carried out at least partly in the module 1, in the surveying device 2, in the operating unit 31 and/or in the cloud system 32. In a further embodiment, the target plate 39 can also have an optional compass 59, which can be viewed from the measuring camera 25 and evaluated in the camera image. This allows the co-ordinates of the module 1 according to the invention to be defined with respect to the external coordinate system, for example in a geodetic coordinate system.

Figure 6:
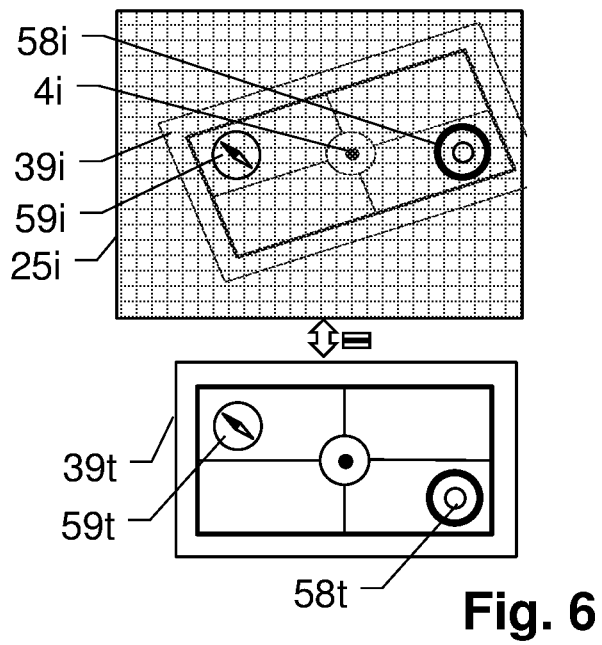
FIG. 6 an illustration of an example of a functional variant of FIG. 5 in one embodiment of a module according to the invention.

FIG. 6 above shows an example of an image 25i of the measuring camera 25 or 25b in the module 1 according to the invention from FIG. 5. In this example, since a target plate 39 is used, in the image 25i not only is the ground mark 4 itself imaged on the ground—as in embodiments according to the invention without a target plate 39—but also the target plate 39. The target plate 39 has known geometrical proportions and dimensions, and preferably a known contrast pattern, known for example in the form of stored data target plate 39t or a stored target reference image 39t, as shown in the lower half of the figure, for example.

The target plate 39i or the ground point 4i can preferably be detected in the image 25i automatically, but at least, such a detection in the image 25i can also be carried out semi-automatically, interactively or manually by the user. In the image 25i it is also possible to measure the imaged target plate 39i and its visual features 38 (or the ground mark 4i itself) in image coordinates, which is symbolized here by a grid pattern. On the basis of the known imaging properties of the measuring camera 25, from the measurement of the target plate 39 and/or ground mark 4i in the image 25i of the measuring camera 25 a relative position of the target plate 39 and/or ground mark 4 from the measuring camera 25 can be determined. Depending on the design, at least one angular direction relative to the ground mark 4 or the target plate 39 in relation to a measuring camera 25—or module 1—coordinate system can be determined from the image coordinates and the imaging properties of the measurement camera 25. In an extended design further information and degrees of freedom, such as distance, can also be determined—in particular, on the basis of the pattern 38 on the target plate 39—and therefore a position of the measuring camera 25, and hence of the module 1 according to the invention relative to the target plate 39, and hence also relative to the ground mark 4 and therefore the localization or the raw data necessary for it.

In doing so, for example, image size, perspective distortions, image coordinates, etc. can be evaluated, for example using an analytical and/or machine learning algorithm. In specific embodiments a module 1 according to the invention can be designed in such a way that by means of the target plate 39 on the ground point 4 it can determine a relative position and/or location of the module 1, in particular of the pivot point with its three local coordinate axes, relative to the ground point 4 on the basis of the image 25*i* of the measuring camera 25 in three or more degrees of freedom, preferably with an accuracy in the range of one millimeter or better. Together with the at least two-axis inclination sensors 26 in the module 1 a localization can thus be determined in at least five degrees of freedom, together with data of an optional compass unit 29 or any other azimuthal reference an absolute referencing can therefore be produced relative to a global coordinate system 20*a* in which the ground mark 4 is registered. The calculations and image processing routines to be performed in the localization can be carried out at least partially with a computing unit 27 in the module 1, in an external operating unit 31, in the surveying device 2 and/or in an external FOG or cloud system 32.

The module 1 according to the invention can optionally also be equipped with a lighting system or a flashlight, so that a high-quality image 25*i* can be obtained even in poor ambient light conditions.

In one embodiment of a module 1 according to the present invention, for example, to perform a localization relative to a ground mark 4 it can have only one measuring camera 25 and one at least two-axis inclination sensor 26, in particular if this module 1 is used with a target plate 39, or if the ground mark 4 has a known visual structure 38 which has sufficient visual features to be able to perform the localization in the desired coordinates with sufficient precision on the basis of an image 25*i* of said mark. In addition to the measuring camera 25 and inclination sensor 26 the module 1 may also have elements not directly relevant to localization, in particular a housing, a power supply 22, a communication module 23, a microprocessor 27 and at most a temperature sensor, a wired or wireless charging unit, along with optional additional components.

With regard to the localization itself in another embodiment a laser pointer 28 or a distance-measuring laser pointer 28*m* can be used, which is aligned to the ground point 4, or at least one defined point of the target plate 39. In doing so, the point of incidence of the laser pointer 28*l* can be detected and measured with the measuring camera 25 in the image 25*i* in its location or spatial direction and included in the calculation of the location. In order to further increase the measurement accuracy the measuring camera 25 can optionally direct the laser pointer 28 to a plurality of points on the target plate 39, measure the distances in each case while at the same time taking pictures, so that the spatial location of the target plate is determined redundantly and the important parameters of the localization can be determined very accurately.

Figure 7:
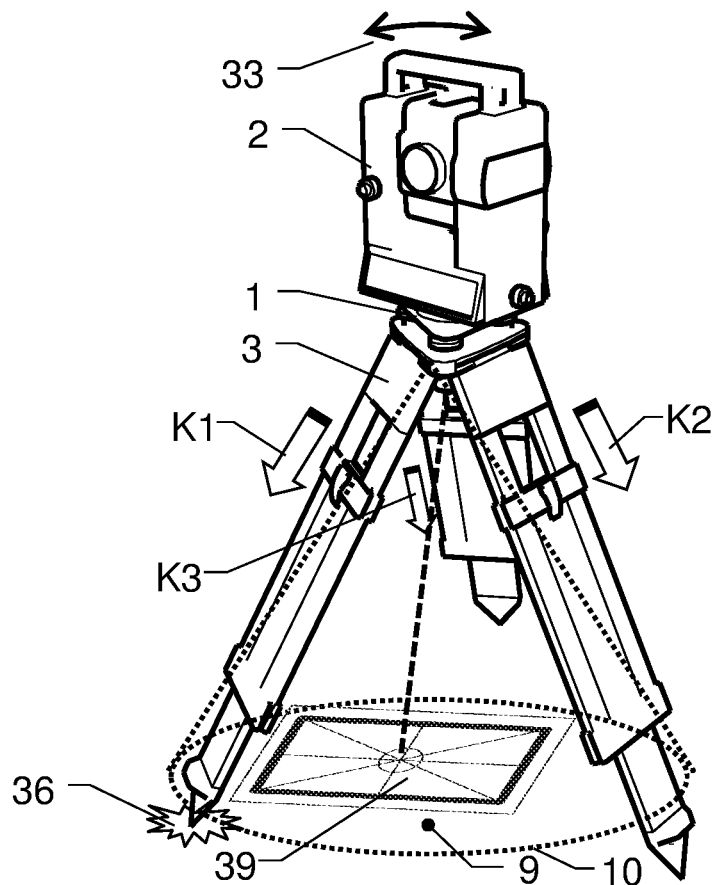
FIG. 7 a further embodiment and design variant of the present invention.

In addition to a one-off positioning of the surveying device 2, in FIG. 7 an optional monitoring of the positioning during the measuring operation with a module 1 according to the invention is described. Here, after the initial positioning, i.e. during the measuring operation with a constant position, these are monitored for any deviations, for example for twisting of the stand, sinking of the stand 36, misalignment of the stand K1, K2, K3 or similar—which can lead to a deviation 33 of the positioning. This can be considered as a part, an extension or a stand-alone aspect of the present invention.

Monitoring of an unstable stand 3, the orientation and/or the positioning height in this case can be checked by one or more measuring cameras 25 in the module 1 according to the invention monitoring the position of the surveying device 2 again after the initial positioning is completed, for example periodically at intervals of several minutes, or triggered by other events, for example by the user, by interference of third parties or before starting a new series of measurements. Alternatively or in addition to a monitoring for stability of the measurements of the inclination sensor 26 and/or compass 29 in the module 1, the monitoring can also involve monitoring for changes in images 25*i* of the measuring camera 25. However, since especially changes in lighting, shadows, etc., can have a significant impact on an image 25*i* of the measuring camera 25, in accordance with the invention not only are the raw image data 25*i* compared, but also an abstract interpretation of the images 25*i*, such as the location of the ground point 4*i* and/or its center or image centroid in image coordinates, a location of features of a target plate 39*i* in the image 25*i*, or similar, which can preferably be detected largely independent of lighting. If a change and/or displacement of the target plate 39*i* or ground mark 4*i* in the field of view 10 of the measuring camera 25 is detected, which is greater than a threshold, an alarm is triggered and/or a new, updated positioning is determined which is taken as a basis for future measurements with the surveying device 2 and provided to the latter accordingly.

In FIG. 8 another schematic detailed view of an exemplary embodiment of a module 1 according to the present invention is shown, in which at least parts of the mandatory and/or optional inner workings of the module 1 are shown.

In this embodiment the module 1 according to the invention acts as a substitute for a standard tribrach 8, by having the function and basic structure of the latter with an adjusting mechanism, for example, three adjusting screws 21 for leveling a surveying device 2 that can be attached to the upper part 1*o* of the module 1, preferably with a quick-release clamping device 50. The adjusting mechanism is preferably designed such that the height of the pivot point 56 does not change during the leveling. At the pivot point 56 in this figure an optional right-sided stop is also shown for defining an azimuthal alignment between the surveying device 2 and module 1. On the bottom of the lower part 1*u* of the module 1, i.e., towards the stand 3, in all embodiments according to the invention in the housing of the module 1 at least one measuring camera 25 and inclination sensors 26 are accommodated, as well as a communication unit 23, a power supply 22 and a control unit 27. The lower part 1*u* of the module 1 can be secured to a standard surveying stand 3 via a central screw.

As examples of other components of a module 1 according to the invention that may be present, at least depending on the embodiment, this figure shows:

a power switch 24 (with optional status indicator such as an LED or a display), a charging connector 22*b* or a wireless charging module for recharging the power supply (with an optional battery indicator for indicating the charge state), a communication indicator 23 for providing information regarding a communication connection (with an optional control element for establishing a communication connection)

a magnetic or gyroscopic compass unit 29, a laser pointer 28 or distance-measuring laser pointer 28*m*, a deflection unit 28*u* for the laser pointer 28 or 28*m* for changing a direction of emission of the laser plummet, an optional angle measuring unit (encoder) for measuring the direction of the deflection unit 28*u*, wherein this sample list need not be exhaustive.

In one embodiment, the module 1 can be designed with a continuous recess 51, through which a laser plummet or laser pointer 28 (with or without distance measuring function), an optical plumb line or a sighting device of a mounted surveying device 2 can be directed through the assembled module 1 onto the ground. Alternatively, instead of a physical recess, an optical path through the module 1 can also be provided with optical components, so that the module 1 does not impede the use of a laser plummet (or similar) of the surveying device 2—e.g. as shown in FIG. 9*b* as an example.

In an extended embodiment the module 1 according to the invention can also be designed with a built-in laser plummet or laser pointer 28, which enables the module 1 also to be provided or retrofitted with this functionality for surveying devices 2 without an integrated laser plummet. This can also enable the control and evaluation of the laser plummet or laser pointer 28 directly by the module 1. The module 1 in this case can have, for example, a laser light source and at least one set of optics, in particular, a collimation optics for the laser radiation of the laser light source and possible deflection elements. In an extended embodiment of the laser pointer 28 this can also be designed as a distance-measuring laser pointer 28*m*, in particular with a reception device for a component of the laser radiation reflected back from a target point of the laser pointer 28*m*, and a distance-measuring unit for determining a distance measurement to the target point, e.g. based on a transit time and/or phase-measurement principle of emitted laser light pulses of the distance-measuring laser pointer 28*m*.

In an extended embodiment with an integrated or an external laser pointer or laser plummet 28,28*m*, the module 1 according to the invention can also be designed with a deflection unit 28*u* for a laser plummet of the surveying device 2, by means of which the optical radiation from this laser plummet can also be aligned to an off-center ground point 4. The deflection unit 28*u* can be motorized or manually driven, for example with movable mirrors, lenses, or glass prisms. A deflection value can be determined by means of a corresponding encoder in the deflection unit 28*u*, by an additional acceleration or inclination sensor on a deflecting element of the deflection unit 28*u* and/or by identifying the location of the point of incidence of the laser plummet radiation on the ground mark 4 in the image of the measuring camera 25. In particular with a deflection unit 28*u* for targeting the ground mark 4 with the laser light beam 28*l* of the distance measuring laser pointer or laser plummet 28*m*, an inclination distance from the module 1 to the ground mark 4 can therefore be determined, from which, for example using measurements from an inclination sensor 26, a normal height of the positioning can be derived. The alignment of the laser beam 28*l* to the ground mark 4 can be carried out automatically under the control of the measuring camera 25, for example by the measuring camera 25 defining the direction of the ground mark 4 in a first step and then controlling the deflection unit 28*u* for the laser pointer or the laser plummet 28 or 28*m*, to align the point of incidence thereof in the camera image to a desired point, e.g. onto a visual marker on a target plate 39.

An optical path of the measuring camera 25 and an optical path of the laser plummet 28 can be designed (e.g. by reflection, spectral separation, etc.) to be at least partially overlapping, specifically to steer both optical paths through a hole in a central screw 35 of the stand 3. In specific embodiments the module 1 according to the invention can also comprise a central screw 35 designed specifically for the module 1, which in its center, i.e. in its central hole, has optical components—such as one or more lenses, a fish-eye lens, et cetera—in order to enlarge the field of view 10 of the measuring camera 25 and/or the laser plummet or laser pointer 28 when viewed through the central screw 35 in the direction of the ground 9 under the stand 3.

FIG. 9*a* shows an example of another embodiment, in which the module 1 is designed without an integrated tribrach function. With regard to the internal components, options and embodiments of the module 1, reference is made to the above descriptions—wherein the tribrach assembly with the leveling facility 21 is not an integral part of the module 1, but instead the module 1 has an upper mounting surface it on which an optional external tribrach module 8 can be attached. For example, the module 1 can have a threaded stud 52 on its top side it and preferably an internal thread 53 on the same axis on the lower side if—preferably both complying with a standard for stand screws.

Specifically shown here is a minimal design of a module 1 according to the invention with the essential components of a central measuring camera 25 and a two-axis inclination sensor 26, an internal power supply 22 and a communication unit 23—which are accommodated in a housing with an upper mounting plate it and a lower mounting plate 1*f*. The reference point or pivot point of the module 1 according to the invention to be localized is preferably located in the center of the upper support surface, e.g. formed by a plane of the upper side of the housing.

In a variant of one embodiment of a module 1 according to the invention in FIG. 9*b*-which, in particular, is designed specifically for use with surveying devices 2 which already have an internal laser plummet or laser pointer,—such a laser plummet of the surveying device 2 can be passed through an opening 55 or drilled hole 55 through the module 1 according to the invention. For example, a field of view of a central measuring camera 25 can also be optionally reflected or pivoted into this opening 55, for example, using a deflection element 25*u* shown here such as a dichroic mirror, a spherical mirror, a drilled hole or a passage window in the mirror. As an alternative, however, the deflection element 25*u* and/or the measuring camera 25 can also be displaced or given away in the module 1 manually or by means of motors, for example in such a way that the field of view thereof is directed centrally through the heart screw, or leaves this central path clear for a laser pointer. The other components shown have already been described elsewhere.

In a further variant of an embodiment of a module 1 according to the invention in FIG. 9*c*—which, in particular, is designed specifically for use with surveying devices 2 which already have an internal laser plummet 28*e*—a laser plummet 28*e* of the surveying device 2 can also be coupled in at the top of the module 1, slides through the module 1, and decoupled again at the bottom. In this case the path of the laser plummet light beam 28e of the surveying device 2 can also be redirected within the module 1, e.g. via mirrors and/or prisms, so that the laser plummet light beam 28e is coupled in at the top of the module 1 and decoupled again at the bottom (preferably but not necessarily through the stand 3 or its heart screw 3). Any path length changes caused by such a beam guidance, particularly in the case of a distance-measuring laser plummet 28e, can be corrected by a corresponding offset or other parameters.

In the case of this type of passage of the laser plummet light beam 28e of the surveying device 2 through the module 1 according to the invention, it is also possible—e.g. using a dichroic mirror, a coaxial in/out-coupling unit, a mirror with a hole for the laser plummet or the like—to couple the measuring camera 25 of the module 1 into the beam path of the laser plummet 28e of the surveying device 2. In a variant of this, the laser plummet light beam 28e passing through the module 1 can also be deflected in the module 1 by a deflection unit 28u, for example, to align the laser plummet 28e or distance-measuring laser plummet 28e of the surveying device 2 onto the ground mark 4, even if these are not located centrally under the original laser plummet axis. In this case, as already described, a deflection value of the current deflection can be detected by the deflection unit 28u, which value is included in the calculation of the positioning. If the deflection unit 28u of the laser plummet light beam 28e in the module 1 is attached before the measuring camera 25 is fed in by reflection, the direction calibration of the field of view 10 of the measuring camera 25 is preserved and, as described, a laser beam alignment of the deflected laser pointer or laser plummet 28 can be determined by means of the measuring camera 25, so that if necessary an encoder unit in the deflection unit can be dispensed with.

The other components of the module 1 have not been shown for the sake of clarity, but are described elsewhere.

FIG. 10 shows a block diagram of one embodiment of a method for positioning in accordance with the present invention. This may comprise:

Providing a stand-alone module 1 according to the invention, in particular a stand-alone intelligent smart tribrach module 1, specifically having its own power supply 22 and a preferably wireless communication interface 23 to the surveying device, specifically to a theodolite or total station. For example, the surveying device can be equipped with a corresponding software module, which automatically identifies the smart tribrach module 1 in its environment and/or provides corresponding menus and/or functions for the integration and operation of the smart tribrach module 1 on the surveying device 2 or on an external operator tablet 32. The stand-alone module 1 is mounted between stand 3 and surveying device 2.

Installing the stand 3 so that it is positioned at least coarsely above the ground point 4, preferably by eye roughly centrally above the ground point 4, but at least in such a way that the ground point 4 comes to rest between the legs of the stand 3.

In this installation, the stand 3 or surveying device 2 thus in particular no longer needs to be accurately centered above the ground point 4. Apart from a rough horizontal alignment of the stand that can be performed by eye or with a circular spirit level, in particular, no adjustment operations on the stand 3 are therefore required, hence especially no iterative and fine length adjustments of the stand legs. The tilt sensors 26 in the module 1 can provide feedback via the communication interface 23 regarding an adequate coarse horizontal alignment and/or an image of the measuring camera 25 can be transferred, in which it can be verified whether the ground point 4 is located in its field of view.

An exact horizontal alignment of the surveying device 2 can then be carried out in known manner by turning the adjusting screws 21 on the integrated or external tribrach 8.

The next steps are preferably carried out automatically with the module 1 according to the invention and are coordinated either by the surveying device 2 or by control from the tablet PC 31b. The fixed or pivotable measuring camera 25, which can be implemented as a central measuring camera 25 and/or peripheral measuring camera 25b, takes pictures of the ground which include the ground point 4 to be used for the referencing in the field of view 10. In one embodiment an automatic image recognition of the ground point 4 in the image 25i can be performed, which identifies and/or classifies the ground point 4i in the image 25i, wherein in particular machine learning approaches can also be applied. For example, a coarse position of the current location can be determined, e.g. via GPS, and a local or cloud database of ground markers 4 at or around this location can be queried, and thus an external coordinate system 20a can be assigned to the ground mark 4. In particular, on an image 25i of the measuring camera 25 shown on the operating unit, one or more potential ground points 4 can be proposed using markers, which the user then confirms, selects or places a manual marker of a desired ground point 4 in the image 25i.

The module 1 according to the invention then carries out the localization of the surveying device in relation to the ground point 4 as described here, preferably automatically. In simpler embodiments of the module 1, at most a semi-automatic localization can also be carried out, for example by a user interaction guided by the module 1, such as manual pouring of the measuring camera 25 in/out, manual alignment of a preferably distance-measuring laser plummet or laser pointer 28 onto the ground point 4, etc. The localization in this case comprises at least the (normal) height h and the x,y offsets, which are calculated by the module 1 or from the raw data supplied by this, such as sensor values and measurement camera images 25i. For localizing the surveying device 2 in relation to the ground point 4, calibration data such as the offsets between the two pivot points of the surveying device 2 and module 1, or other information about the devices involved and their setup, are also automatically taken into account. This calibration data can be transferred and synchronized, for example, at the beginning of the installation during an initialization stage.

Alternatively, or especially in case the ground point 4 cannot be identified or cannot be detected, the following steps can also be performed:

Placing a target plate 39 or code panel on the ground point 4, preferably centered.

Taking a picture 25 with the target plate 39 in the field of view 10 of the measuring camera 25.

Calculating the positioning height h and the x,y offsets of the ground mark 4 marked with the target plate 39 relative to the foot of the perpendicular of the module 1 according to the invention, and thus also relative to the surveying device 2.

Preferably, an orientation of the module 1 according to the invention with respect to the surveying device 2 should be known to an accuracy of approximately 10 arc-minutes, which in most applications results in a tolerable error of approximately 1 mm for an x,y offset of the ground point of 35 cm. To do so, the module 1 can be implemented with an optional compass unit, and/or north or the calibration of the azimuthal direction Hz0 can be determined by the surveying device with sufficient accuracy and this orientation can then be provided by the surveying device 2 to the module 1 according to the invention, or the final calculation of the full 6-DoF localization can also be carried out externally to the module 1, e.g. In the surveying device 2 or the control panel 31. An orientation can also be carried out using a compass 59 integrated in the target plate 39, which using an image capture and image analysis determines the azimuthal direction of the module 1 on the basis of an orientation of the compass needle in the image of the measuring camera 25.

In summary, or in other words, the exemplary embodiment in the figure specifically shows:

In block 60 the module 1 according to the invention is attached between a stand 3 and a surveying device 2.

In block 61 a coarse installation of the stand 3 is carried out in an area above a ground point 4 as a reference point and a connection is established for communication between module 1 and an external control device or a surveying device 2r, optionally with synchronization of calibration data of the communication participants.

In block 62 inclination information of the module 1 is captured and an image 25i of the ground 9 under the stand 3 is recorded using a measuring camera 25 in the module.

In block 63 an identification or selection of the ground point 4i in the image 25i is then carried out as a reference for localization of the surveying device 2.

In block 64 the ground point 4 is measured in the image 25i by the module 1 and the localization is calculated. This can optionally incorporate additional auxiliary equipment such as target plate 39, or other measurements of sensors in the module 1 and/or surveying device 2, in particular using a distance-measuring laser pointer 28m, which is aligned to the ground mark 4.

In block 64 the localization result or the necessary raw data for this are provided by the module 1 to the surveying device 2 via a preferably wireless communication link 23.

What is claimed is:

1. A stand-alone module for localizing a surveying device installed with a stand above a ground mark, the stand-alone module comprising:
    a housing configured to be attached between the stand and the surveying device, the housing having a lower mounting plate for connecting to the stand and an upper mounting plate for connecting to the surveying device;
    a measuring camera unit configured such that when the stand-alone module is mounted on the stand the ground mark can be detected in a field of view of the measuring camera unit;
    a power supply;
    an inclination sensor determining an inclination of the stand-alone module with respect to a horizontal direction;
    a communication unit for communication with the surveying device or an external operating unit;
    a localization unit which calculates a location in relation to the ground mark and provides the location via the communication, the calculation of the location being based on:
        image information of the ground mark from the measuring camera unit or a visual pattern of a defined target plate in the image information, and
        inclination information from the inclination sensor.

2. The stand-alone module according to claim 1, further comprising:
    a laser pointer, with the laser radiation of which an electro-optical distance measurement to a point of incidence of the laser radiation is performed, and
    a deflection unit for the laser pointer, wherein the laser radiation thereof is oriented onto the ground point with respect to the stand-alone module, and
    wherein the localization unit performs a localization with:
        distance information from the electro-optical distance measurement, and
        deflection information of the laser radiation with respect to the stand-alone module.

3. The stand-alone module according to claim 2, wherein the deflection unit is moved by motors or the deflection unit is moved manually by a user.

4. The stand-alone module according to claim 1, wherein the stand-alone module comprises a tribrach with one, two, or three manually adjustable adjustment screws.

5. The stand-alone module according to claim 1, wherein the localization unit is configured such that, based on a coarse position of a current location of the stand-alone module, either provided or determined by the stand-alone module, the localization unit queries a local or cloud database of ground marks at or around the current location, and on the basis of the database an external coordinate system is assigned to the ground mark at the current location.

6. The stand-alone module according to claim 1, wherein the stand-alone module further comprises an electronic compass, and the localization unit incorporates azimuthal information from the compass in a localization.

7. The stand-alone module according to claim 1, wherein the field of view of the measuring camera unit is arranged centrally right through the stand.

8. The stand-alone module according to claim 1, wherein the field of view of the measuring camera unit is arranged past and to the side of a stand shoulder or a stand plate of the stand and is aligned in the direction of the ground point.

9. The stand-alone module according to claim 1, wherein the surveying device comprises:
    a theodolite,
    a tachymeter,
    a total station,
    a laser scanner,
    a laser tracker,
    a GNSS receiver, or
    a leveler or rotating laser,
    and the stand is a mounting device in the form of:
    a tripod,
    a surveying stand,
    a clamp stand,
    a surveying pillar, or
    a temporarily mounted surveying console.

10. A target plate designed to provide substantially horizontal support on a ground mark for use with a stand-alone module according to claim 1.

11. The target plate according to claim 10, the target plate comprising:
    a magnetic needle compass in the plane of the target plate to determine a north-referenced azimuthal alignment of the target plate, or a circular spirit level or two orthogonal tubular spirit levels in a plane of the target plate for determining a horizontal alignment of the target plate.

12. A system consisting of a surveying device with an integrated stand-alone module according to claim 1.

13. A method for localizing a surveying device positioned on a stand above a ground mark with a stand-alone module which is attached between the stand and the surveying device, the method comprising:
    a recording of an image of the ground under the stand with a measuring camera in the stand-alone module;

identifying a ground point in the image and surveying the ground point in the image;

detecting an inclination value of the stand-alone module in at least two axes in relation to a horizontal or vertical direction with an inclination sensor in the stand-alone module;

calculating a localization of the stand-alone module with respect to the ground mark based on measurement of the ground point in the image and of the inclination value, with a localization unit in the stand-alone module;

directly or indirectly communicating a determined position or raw data for a position determined by the stand-alone module by means of a communication unit in the stand-alone module to the surveying device; and establishing a localization of the surveying device relative to the ground point with the localization provided by the stand-alone module.

14. The method according to claim 13, further comprising:

measuring an inclined distance from the stand-alone module to the ground point with a distance-measuring laser pointer aligned to the ground point by an alignment unit; and taking this inclined distance into account in the localization.

15. The method according claim 13, further comprising:

marking the ground mark with a target plate, which target plate is designed with known visual features in such a way that by measurement of the visual features in the image of the measuring camera a relative position between the measuring camera and the ground mark is determined in at least three degrees of freedom, wherein the localization of the stand-alone module is carried out based on this relative position.

* * * * *